United States Patent

[19]

Li

[11] Patent Number: 6,120,450

[45] Date of Patent: Sep. 19, 2000

[54] PHASE AND/OR AMPLITUDE ABERRATION CORRECTION FOR IMAGING

[75] Inventor: Yue Li, New South Wales, Australia

[73] Assignee: Commonwealth Scientific and Industrial Research Organisation, Capital Territory, Australia

[21] Appl. No.: 09/266,604

[22] Filed: Mar. 11, 1999

Related U.S. Application Data

[63] Continuation-in-part of application No. 08/894,069, Oct. 24, 1997, Pat. No. 6,027,447, which is a continuation of application No. PCT/AU96/00031, Jan. 23, 1996.

[30] Foreign Application Priority Data

Jan. 23, 1995 [AU] Australia .................................. PN0693
May 25, 1995 [AU] Australia .................................. PN3174

[51] Int. Cl.$^7$ ...................................................... A61B 8/00
[52] U.S. Cl. ................................................................ 600/447
[58] Field of Search ................................... 600/443, 447; 73/602, 625–626

[56] References Cited

U.S. PATENT DOCUMENTS

| | | |
|---|---|---|
| 4,395,909 | 8/1983 | Steinberg et al. . |
| 4,471,785 | 9/1984 | Wilson et al. . |
| 4,817,614 | 4/1989 | Hassler et al. .......................... 600/442 |
| 4,835,689 | 5/1989 | O'Donnell ........................ 364/413.25 |
| 4,852,577 | 8/1989 | Smith et al. ............................. 600/443 |
| 4,989,143 | 1/1991 | O'Donnell et al. . |
| 5,092,336 | 3/1992 | Fink . |
| 5,172,343 | 12/1992 | O'Donnell . |
| 5,184,623 | 2/1993 | Mallart . |
| 5,268,876 | 12/1993 | Rachlin . |
| 5,331,964 | 7/1994 | Trahey et al. ........................... 600/447 |
| 5,357,962 | 10/1994 | Green . |
| 5,388,461 | 2/1995 | Rigby . |
| 5,423,318 | 6/1995 | Li et al. . |
| 5,460,180 | 10/1995 | Klepper et al. . |

(List continued on next page.)

FOREIGN PATENT DOCUMENTS 2219089  11/1989  United Kingdom .

OTHER PUBLICATIONS

A. Buffington et. al., "Correction of atmospheric distortion with an image–sharpening telescope," *J. Opt. Soc. Am.*, vol. 67, No. 3, pp. 298–303, Mar. 1977.

(List continued on next page.)

*Primary Examiner*—Francis J. Jaworski
*Attorney, Agent, or Firm*—Sughrue, Mion, Zinn, Macpeak & Seas, PLLC

[57] ABSTRACT

Disclosed is a pulse-echo array imaging system which includes a conventional imaging mode and an aberration-measurement mode. When the system is switched to the aberration mode, several algorithms disclosed in the present invention are used to measure transmission and reception phase- and amplitude-aberration profiles. The measured transmission and reception aberration profiles are then used for aberration corrections for transmission and reception respectively in the conventional imaging mode. Disclosed are phase- and amplitude-aberration correction algorithms using near-field signal redundancy. It applies dynamic near-field correction on common-midpoint signals before the cross-correlation function between them is calculated. Also disclosed are phase- and amplitude-aberration measurement algorithms for measuring and correcting different transmission and reception aberration profiles. Further disclosed are phase- and amplitude-aberration correction algorithms using common-midpoint signals collected with sub-arrays to measure angle-dependent aberration profiles. Also disclosed are methods for implementing the phase- and amplitude-aberration correction algorithms disclosed in the present invention on a two-dimensional array. Further disclosed is a method for the simultaneous collection of common-midpoint signals to reduce the effect of tissue motion on the aberration-measurement accuracy. Other methods and algorithms for improving the measurement accuracy and reducing the measurement time are also disclosed.

38 Claims, 16 Drawing Sheets

U.S. PATENT DOCUMENTS

| | | |
|---|---|---|
| 5,487,306 | 1/1996 | Fortes . |
| 5,531,117 | 7/1996 | Fortes . |
| 5,551,433 | 9/1996 | Wright et al. . |
| 5,566,675 | 10/1996 | Li et al. . |
| 5,673,699 | 10/1997 | Trahey et al. . |

OTHER PUBLICATIONS

S. W. Flax et al., "Phase–aberration correction using signals from point reflectors and diffused scatterers: basic principles," *IEEE Trans. Ultrason., Ferroelect., Freq. Cont.*, vol. 35, No. 6, pp. 758–767, Nov. 1988.

J. P. Hamaker et al., "Image sharpness, Fourier optics, and redundant–spacing interferometry," *J. Opt. Soc. Am.*, vol. 67, No. 9, pp. 1122–1123, Aug. 1977.

J. A. Hileman et al., "Automated static correction," *Geophys. Prosp.*, vol. 16, pp. 326–358, 1968.

M. Hirama et al., "Imaging through an inhomogeneous layer by least–mean–square error fitting," *J. Acoust. Soc. Am.*, vol. 75, No. 4, Apr. 1984.

M. Ishiguro, "Phase error correction in multi–element radio interferometer by data processing," *Astron. Astrophys. Suppl. Ser.*, vol. 15, pp. 431–443, 1974.

R. C. Jennison, "A phase sensitive interferometer technique for the measurement of the Fourier transforms of spatial brightness distributions of small angular extent," *Mon. Not. R. Astron. Soc.*, vol. 118, No. 3, pp. 276–284, 1958.

D. L. Liu et al., "About the application of the Van Cittert–Zernike theorem in ultrasonic imaging," *IEEE Trans. Ultrason., Ferroelect., Freq. Cont.*, vol. 42, No. 4, pp. 590–601, Jul. 1995.

H. R. Mallart et al., "The Van Cittert–Zernike theorem in pulse echo measurements," *J. Acoust. Soc. Am.*, vol. 90, No. 50, pp. 2718–2727, Nov. 1991.

R. A. Muller et al., "Real–time correction of atmospherically degraded telescope images through image sharpening," *J. Opt. Soc. Am.*, vol. 64, No. 9, pp. 1200–1209, Sep. 1974.

L. Nock et al., "Phase aberration correction in medical ultrasound using speckle brightness as a quality factor," *J. Acoust. Soc. Am.*, vol. 85, No. 5, pp. 1819–1833, May 1989.

M. O'Donnell et al., "Phase–aberration correction using signals from point reflectors and diffused scatterers: Measurement," *IEEE Trans Ultrason., Ferroelect., Freq. Cont.*, vol. 35, No. 6, pp. 768–774, Nov. 1988.

D. Rachlin, "Direct estimation of aberration delays in pulse–echo image systems," *J. Acoust Soc. Am.*, vol. 88, No. 1, pp. 191–198, Jul. 1990.

B. D. Steinberg, "Microwave imaging of aircraft," *Proc. IEEE*, vol. 76, No. 12, pp. 1578–1592, Dec. 1988.

M. T. Taner et al., "Estimation and correction of near–surface time anomalies," *Geophys.*, vol. 39, No. 4, pp. 442–463, Aug. 1974.

W. F. Walker et al., "Speckle coherence and implications for adaptive imaging," *J. Acoust. Soc. Am.*, vol. 101, No. 4, pp. 1847–1858, Apr. 1997.

O. Yilmaz, "Seismic data processing," *Society of Exploration Geophysicists*, ch. 3, 1987.

PHASE AND/OR AMPLITUDE ABERRATION CORRECTION FOR IMAGING

This is a Continuation-in-Part of application Ser. No. 08/894,069 filed Oct. 24, 1997 and now U.S. Pat. No. 6,027,447, which is a continuation of PCT/AU96/00031 filed Jan. 23, 1996.

FIELD OF THE INVENTION

This invention relates to coherent imaging systems such as ultrasound pulse-echo imaging systems. More particularly, it relates to methods for phase and amplitude aberration corrections to improve image quality. It can also be used for measurement accuracy improvement in media, such as attenuation, velocity, and blood flow velocity.

BACKGROUND OF THE INVENTION

The ultrasound pulse-echo technique (echography) is widely used in medical imaging. This imaging method currently uses an array of transducer elements to transmit a focused beam into the body, and each element then becomes a receiver to collect the echoes. The received echoes from each element are dynamically focused to form an image. Focusing on transmission and reception is performed assuming that the velocity inside the body is uniform, and is usually assumed to be 1540 m/s. Unfortunately, the velocity inside the body is not constant; it varies from 1470 $ms^{-1}$ in fat to greater than 1600 $ms^{-1}$ in some other tissues, such as collagen. This variation will result in increased side lobes and degraded lateral resolution. It is one of the major difficulties for improving lateral resolution of ultrasound imaging system. Phase aberration caused by velocity variation also influence the accuracy of many other measurements, such as attenuation and blood flow velocity. Amplitude aberrations have also been observed and reported in many works in ultrasound medical imaging, especially for imaging some complex tissue structures like female breast. Amplitude aberrations also influence the quality of images, even though they are not as important as phase aberrations. In some cases, both amplitude and phase aberration corrections are needed to form a good image.

Many methods have been developed to correct aberrations. These prior art methods are reviewed below.

One type of prior art method uses the wavefront from a special target, such as a dominant point target or a specular reflecting plane, to measure the phase-aberration profile. In astronomical imaging, direct-wavefront-measurement method is used to measure phase and amplitude aberrations caused by the atmosphere (R. K. Tyson, *"Principle of adaptive optics,"* Academic Press, ch. 5, 1991). In medical ultrasound imaging, the nearest neighbor cross-correlation algorithm (S. W. Flax and M. O'Donnell, *"Phase-aberration correction using signals from point reflectors and diffused scatterers: basic principles,"* IEEE Trans. Ultrason., Ferroelect., Freq. Cont., vol. 35, no. 6, pp. 758–767, November 1988, and U.S. Pat. No. 4,989,143 by O'Donnell) and the maximum-sharpness algorithm (L. Nock, and G. E. Trahey, "Phase aberration correction in medical ultrasound using speckle brightness as a quality factor," *J. Acoust. Soc. Am.,* vol. 85, no. 5, pp. 1819–1833, May 1989) can be used when there is a dominant point target.

The nearest-neighbor cross-correlation and maximum sharpness algorithms can also uses echoes from randomly distributed scatterers that generate speckle in an image to measure the phase-aberrations. In the nearest-neighbor cross-correlation method, a focused beam is transmitted and the phase-aberration profile is derived from the cross-correlation measurements between neighboring elements. An iterative method is used to improve the measurement accuracy. The maximum sharpness an iterative phase-correction procedure in which the timing of acoustic signals transmitted and received from individual elements is adjusted to optimize the quality indicator.

Prior art methods which uses the principle of the nearest-neighbor cross-correlation algorithm include U.S. Pat. No. 4,471,785 by Wilson et al., U.S. Pat. No. 4,817,614 by Hassler et al., U.S. Pat. No. 5,184,623 by Mallart, 5,172,343 by O'Donnell, U.S. Pat. No. 5,388,461 by Rigby, U.S. Pat. No. 5,487,306 and 5,531,117 by Fortes, U.S. Pat. Nos.5, 423,318 and 5,566,675 by Li et al.

Prior art methods which uses the principle of the maximum sharpness algorithm include U.S. Pat. No. 4,852,577 by Smith et al., U.S. Pat. No. 5,331,964 by Trahey et al., and U.S. Pat. No. 5,423,318 by Green.

The Translating Apertures algorithm (W. F. Walker and G. E. Trahey, *"Speckle coherence and implications for adaptive imaging,"* J. Acoust. Soc. Am., vol. 101, no. 4, pp. 1847–1858, April 1997 and U.S. Pat. No. 5,673,699 by Trahey et al) is a modification of the nearest neighbor cross-correlation algorithm. It uses identical effective apertures to collect near-neighbor signals.

The differences between the near-field signal redundancy algorithm described in the present invention, the nearest-neighbor cross-correlation algorithm, and the translating apertures algorithm have been discussed in Yue Li and Robert Gill, *"a comparison of matched signals used in three different phase-aberration correction algorithms"* 1998 IEEE International Ultrasonics Symposium. One of the differences between the nearest-neighbor cross-correlation algorithm and the algorithm in present invention is that, non-common midpoint signals are included in matched signals collected with the nearest-neighbor cross-correlation algorithm, but they are not included in the matched signals collected with the algorithm described in the present invention. This results in increased similarity between matched signals. The translating apertures algorithm is also different from the near-field signal redundancy algorithm described in the present invention. One of the major differences is that reciprocal signals are always included in matched signals collected with the translating apertures algorithm, but they are not included in the algorithm described in the present invention. It is a disadvantage to include the reciprocal signals in matched signals, since reciprocal signals are not sensitive to phase aberrations. When phase-aberrations exist they decrease the similarity between matched signals and reduce the measurement accuracy.

A method using the signal-redundancy principle to measure the phase-aberration profile has been developed (D. Rachlin, "Direct estimation of aberration delays in pulse-echo image systems," J. Acoust. Soc. Am. vol. 88, no. 1, pp. 191–198, July 1990 and U.S. Pat. No. 5,268,876 by Rachlin). Since signal redundancy principle is an approximation for targets in the near field, common-midpoint signals are not identical for targets in the near field. Additional signal processing is required to make it work properly for targets in the near field. In the theoretical analysis, Rachlin has assumed that targets are small and compact (Col. 3, lines 8) located at the focal point so that far field analysis can be used, and proposed to use the whole aperture for transmission in the algorithm to allow extended target distribution (Col. 6, lines 53), and as a result, solving the near-field problem. One disadvantage of transmitting from the whole aperture is that the transmitted beam will be distorted by phase aberrations and it will influence the measurement accuracy. Another disadvantage of transmitting from the whole aperture is that the far-field approximation is only valid in a small depth range around the focal point (if the focus is not already distorted by phase aberrations), therefore only a short signal length can be used for the measurement. The near-field signal redundancy algorithm described in the present invention uses a different method to solve the near-field problem. A technique of dynamic near-field correction applied on common-midpoint signals is proposed to make common-midpoint signals become more similar for targets in the near field. It allows a long period of signals be used for the measurement to increase measurement accuracy. Using small apertures for transmission will reduce the influence of aberration on the measurement accuracy. Other near-field signal redundancy algorithms described in the present invention which are not included in Rachlin's method are: the sub-array technique for collecting common-midpoint signals, near-field signal redundancy algorithms for measuring phase aberrations when the transmission and reception aberration profiles are different, near-field signal redundancy algorithms for two-dimensional arrays, near-field signal redundancy algorithms for amplitude-aberration corrections etc.

Common-midpoint signals are also used for aberration measurement in seismic imaging (O. Yilmaz, "*Seismic data processing,*" Society of Exploration Geophysicists, ch. 3, 1987). It uses echoes from a specular reflecting plane which is a special kind of target. The common midpoint signals are not redundant when there is a specular reflecting plane in the near field, because the position of the reflecting point is different for different transmitter or receiver positions. Therefore, the seismic method is not a signal-redundancy method and is fundamentally different from the method proposed in this invention.

SUMMARY OF THE INVENTION

One of the main objects of this invention is to provide a better algorithm and apparatus for phase-aberration measurements in pulse-echo imaging systems.

To achieve this object, a near-field signal redundancy algorithm is disclosed in this invention. This method comprises collecting common-midpoint signals by transmitting from one element at a time and receiving at a plural number of elements until all elements have transmitted. These common-midpoint signals are dynamically corrected to increase the similarity between them for echoes from targets in the near field. Corrected common-midpoint signals are then cross-correlated with one another and the peak positions and values of these normalized cross-correlation functions are measured. The phase-aberration profile is derived from a process of weight and adding from the measured peak positions of the cross-correlation functions. When necessary, the undetermined linear terms are adjusted iteratively to maximize the image energy in the region of interest, which will optimize the performance of the system.

Another main object of this invention is to provide algorithms for measuring and correcting phase-aberration profiles when the transmission and reception phase-aberration profiles are different.

To achieve this object, two different methods are disclosed. The first method can be used if the difference between transmission and reception phase-aberration profiles is acceptable for image-formation purposes but unacceptable for phase-aberration measurements. In this case, the average of the transmission and reception phase-aberration profiles is measured and used for phase-aberration corrections. The second method can be used if the difference between transmission and reception phase-aberration profiles is unacceptable for both image formations and phase-aberration measurements. In this case, the transmission and reception phase-aberration profiles are measured separately and used for transmission and reception phase-aberration corrections respectively. This algorithm has taken steps to ensure that the arbitrary linear terms for transmitting and reception are identical. This is important; otherwise, the transmission and reception beams could be at different directions after the phase-aberration correction, which may severely reduce the quality of the image.

A third main object of this invention is to provide algorithms for measuring and correcting angle-dependent phase-aberration profiles.

To achieve this object, a sub-array phase-aberration correction algorithm is disclosed in the present invention. This method comprises generating common-midpoint signals collected with sub-array steered at a selected direction. These common-midpoint signals collected with sub-arrays are then used to measure the phase-aberration profile. The measured phase-aberration value for each sub-array is then assigned to all elements in the sub-array. By changing the steering directions of beams generated by sub-arrays, a plural number of phase-aberration profiles are measured, and they are used to correct for phase aberrations in the image at corresponding directions respectively. Instead of steering at the same direction, the beams of sub-arrays can also be formed along an image line. A plural number of phase-aberration profiles can be measured, one for each (or several) image line, and they are used to correct for phase aberrations at corresponding image lines respectively.

A fourth main object of this invention is to provide algorithms for measuring and correcting amplitude aberrations.

To achieve this object, an amplitude-aberration correction algorithm is disclosed in the present invention, which is incorporated into the phase-aberration correction algorithm. This method comprises measuring the energy of common-midpoint signals in the cross-correlation window and taking the logarithm of the ratio of their energies. Then the amplitude-aberration profile is derived. This algorithm can also be used with the sub-array technique to measure angle-dependent amplitude aberration profiles. Algorithms for measuring different (small and large difference transmission and reception amplitude-aberration profiles are also disclosed in the present invention.

A fifth main object of this invention is to provide algorithms for implementing the phase- and amplitude-aberration measurement algorithms disclosed in the present invention on a two-dimensional array.

To achieve this object, an all-row-plus-two-column algorithm is disclosed in the present invention. This algorithm comprises applying the phase- and amplitude-aberration measurement algorithms disclosed in the present invention for one-dimensional arrays on all rows and two columns, such as the two columns at the boundary of the array. The results from the two column measurements are used to derive a linear term for each row measurement result. These linear terms are incorporated in to the row results to obtain the two-dimensional phase- and amplitude-aberration profiles. Since the undetermined profile is a curved plane, which is not linear, for two-dimensional arrays, one of the four values at the four corners of the array is adjusted iteratively to maximize the image energy in the region of interest, which will optimize the performance of the system. These algorithms have also taken steps to ensure that the arbitrary linear terms for transmitting and reception are identical. To improve the measurement accuracy, the profiles derived from all-row-plus-tow-column and all-column-plus-two-row can be averaged.

A sixth main object of this invention is to provide a method for reducing the influence of tissue movement on the aberration measurement accuracy.

To achieve this object, signals that occupy different frequency bands can be transmitted simultaneously from three or more elements and then, the received signals are filtered to obtain individual common-midpoint signals that are going to be cross-correlated with one another. In this case, the two common-midpoint signals that are used to calculate a cross-correlation function are collected simultaneously. Therefore, the tissue-motion effect on the measurement accuracy is reduced.

The foregoing and other objects and algorithms disclosed in the present invention will be more readily apparent from the following description and appended claims when taken with drawings. It here will be understood that the drawings are for purposes of illustration only, the invention not being limited to the specific embodiments disclosed therein.

BRIEF DESCRIPTION OF THE DRAWINGS

In the drawing, wherein like reference characters refer to the same parts in the several views.

DETAILED DESCRIPTION OF THE PREFERRED EMBODIMENT

Figure 1:
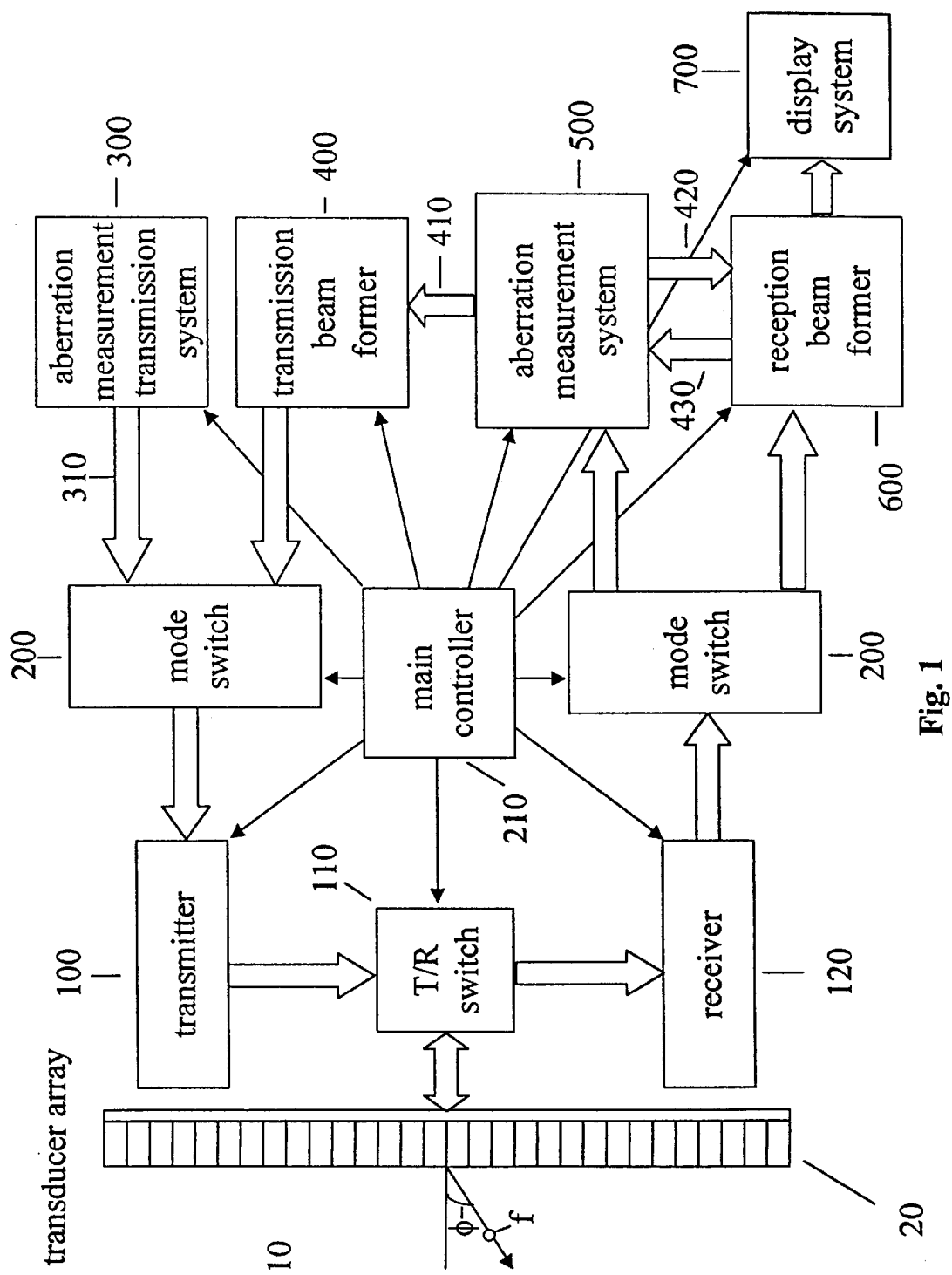
FIG. 1 is a block diagram showing an example of a medical ultrasound imaging system with aberration-correction ability using algorithms disclosed in the present invention.

This invention includes a group of algorithms for phase and/or amplitude aberration corrections in imaging. They are based on the near-field signal redundancy principle. The problems caused by the fact that targets are in the near field have been solved with the application of dynamic near-field delay corrections on common-midpoint signals. A block diagram of an exemplary ultrasonic imaging system for implementing these algorithms is shown in FIG. 1. It contains two operational modes. One is the conventional imaging mode and the other is the aberration-measurement mode. The system can be switched between these two modes with the mode switcher 200. In the conventional imaging mode, the transmit beam former 400 generates delay values and electrical signals for a selected focusing direction $\phi$ and depth $f$ in the tissue 10, and then these signals are sent to the transmitter 100, where they are magnified and sent to the transducer array 20 through the transmit/receive switch 110, which is switched to the transmission position. The transducer array comprises a plurality of separately driven transducer elements. The transducer array 20 may comprise either a one-dimensional array having a plurality of linearly disposed transducer elements, or a two-dimensional array in which the transducer elements are disposed in a matrix. In either configuration, transducer elements in the transducer array 20 convert these electrical signals into acoustic waves, which propagate in the tissue 10. These acoustic waves travel through various tissue layers of the patient and then, they are reflected back from a region of interest. The reflected acoustic waves are converted to electrical signals by the transducer elements in the transducer array 20. These electrical signals are routed to the receiver 120 through the transmit/receive switch 110, which is switched to the reception position. The signals are magnified, filtered, and converted to digital signals in the receiver 120, and then they are sent to the reception beam former 600 to form an imaging beam with dynamic focusing along the transmission focusing direction $\phi$. By changing the value of the transmission focusing direction $\phi$ through a set of angles and repeating the above process, a plurality number of image beams are formed. These beams are then sent to the display system 700 for post beam-formation processing, compression, scan conversion, and display.

The focusing on transmission of the system is achieved by delaying the transmission signals for each transducer element with a proper amount so that the acoustic waves generated by all transducer elements arrive at the focal point f at the same time. Similarly, the dynamic focusing on reception is achieved by delaying the received signals at each transducer element with a proper amount so that echoes from the same depth along the focal direction $\phi$ in all received signals add coherently. The delays for focusing are derived with the assumption that the propagation velocity of acoustic waves in the body is homogenous. However, as it is known, different tissues in the body may have different velocities, and these will introduce phase aberrations that cause focusing errors in the imaging system. The different attenuation coefficients in different tissue will cause amplitude aberrations that may also degrade the performance of the imaging system.

This invention has disclosed a group of phase and/or amplitude aberration correction algorithms to improve the image quality. When aberration correction is needed, the imaging system in FIG. 1 will be switched to the aberration-correction mode with the mode switch 200. In this mode, the aberration-measurement transmission system 300 generates electrical signals that suitable for the aberration measurement algorithms disclosed in this invention. Generally, the aberration-measurement transmission system 300 generates only a signal for one selected transducer element at a time and sends it to the transmitter 100, where it is magnified. Then, this electrical signal is converted to an acoustic wave by the selected transmission transducer element in the transducer array 20. The reflected acoustic waves from the region of interest generated by the transmitted acoustic wave from the selected transducer element are converted to electrical signals by the transducer elements in the transducer array 20. These received signals are routed to the receiver, which they are magnified, filtered, and converted into digital signals. These signals are then send to the aberration measurement system 500 for storage and/or processing for aberration measurement. Then, the aberration-measurement transmission system 300 generates a signal for another selected transducer element and sends it to the transmitter 100. The received signals generated by transmission from this transducer element are also stored and/processed in the aberration measurement system 500. This process will be repeated until all transducer elements have transmitted. The selection of the transmission transducer element may also be done at the transmitter 100. It is also not necessary to save and/or process all received signals for each transmission in the aberration measurement system 500; depending on the aberration correction algorithm, only signals received at a few transducer elements are needed for the aberration measurement. The collected signals in the aberration measurement system 500 are processed according to the selected aberration-correction measurement algorithms to derive the aberration profiles. The derived transmission aberration profiles are then sent to the transmission beam former 400 for transmission aberration corrections, and the derived reception aberration profiles are then send to the reception beam former 600 for reception aberration corrections. Some algorithms disclosed in this invention involve iteratively adjusting the undetermined aberration values for transducer elements at the end of the transducer array 20. To implement this, the formed beams for the region of interest in the reception beam former 600 are send back to the aberration measurement system 500, where they are processed according to the selected algorithm for optimizing the undetermined aberration values for elements at the end of the transducer array 20.

After the aberration measurement, the system will be switched back to the conventional imaging mode with the mode switch 200 to form aberration corrected images with improved image qualities.

Next, the aberration measurement algorithms disclosed in this invention are described below in detail.

I. Phase-Aberration Correction Algorithm Using Near-Field Signal Redundancy For One-Dimensional Arrays In this phase-aberration algorithm, it is assumed that the transmission and reception phase-aberration profiles can be approximated as identical, and the aberration profile is not angle dependent. This algorithm includes the following steps:

1. First, a data set $y_{k,1}(t)$ is collected by transmitting on all elements, one at a time, and receiving at several elements for each transmission, where k is the transmitter element index and l is the receiver index. This data set is sent to the aberration-measurement system 500.

Figure 2:
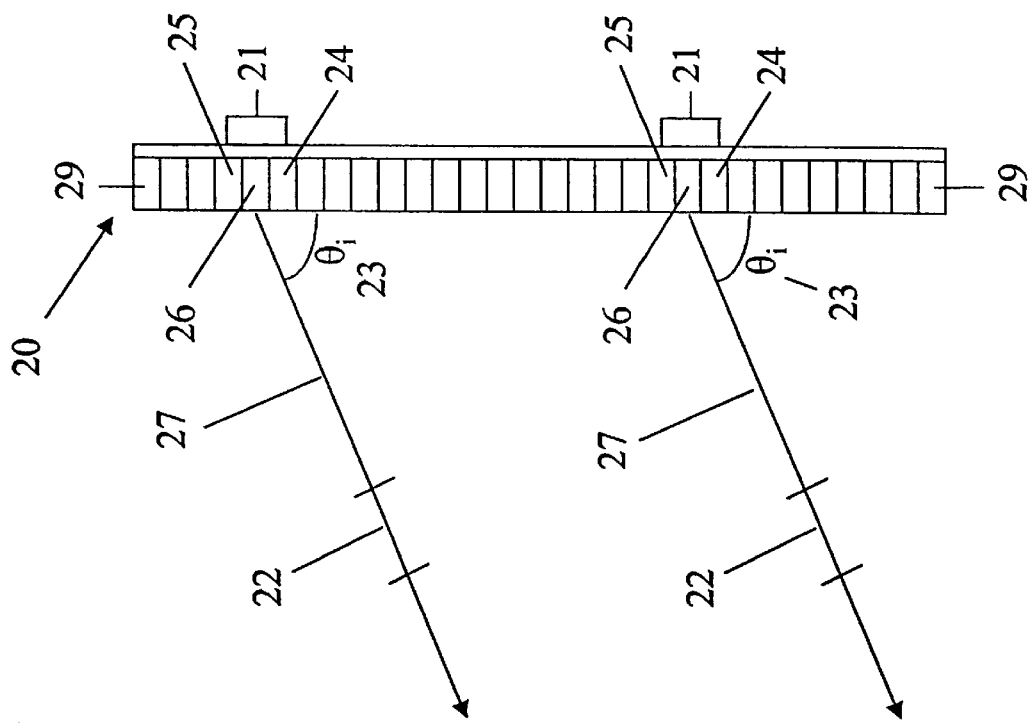
FIG. 2 is a schematic representation of the transducer array, the three neighboring elements used to collect common-midpoint signals, the correction angle for the dynamic near-field correction, the depth and width of the cross-correlation window for implementing the algorithm disclosed in the present invention.
Figure 3:
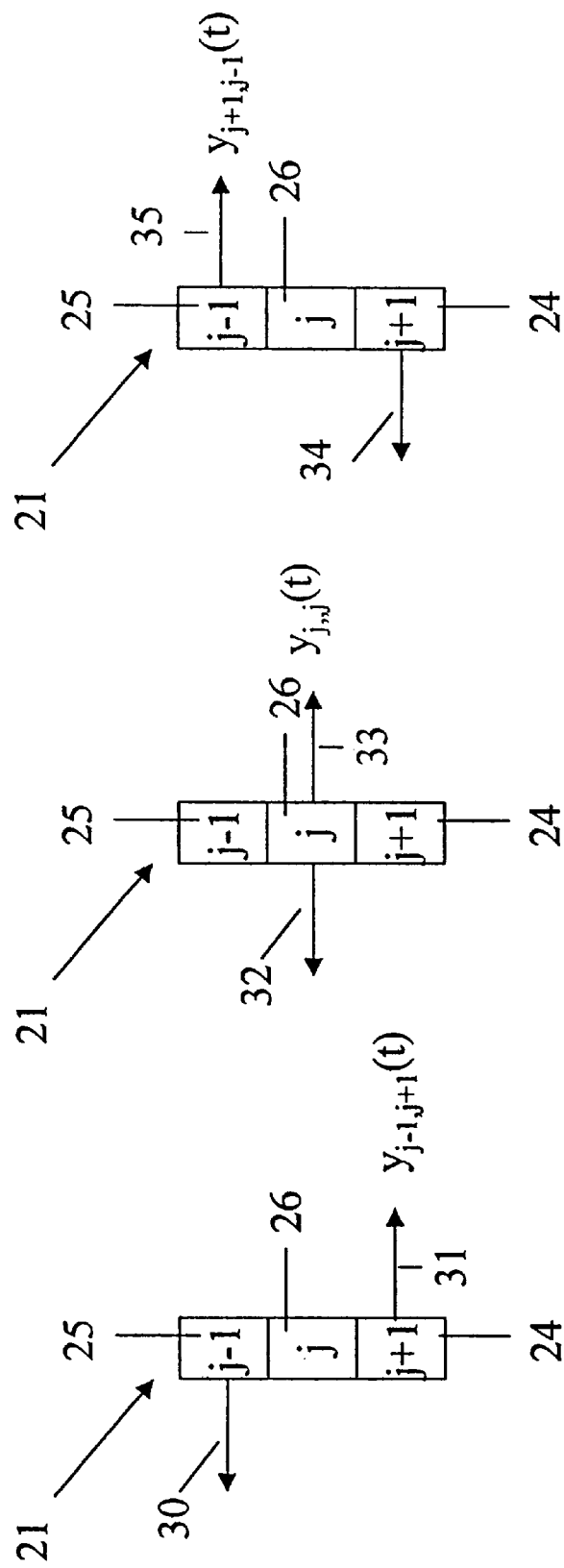
FIG. 3 is a schematic representation of the collection of three common-midpoint signals with three neighboring elements by transmitting from one element at a time.
Figure 4:
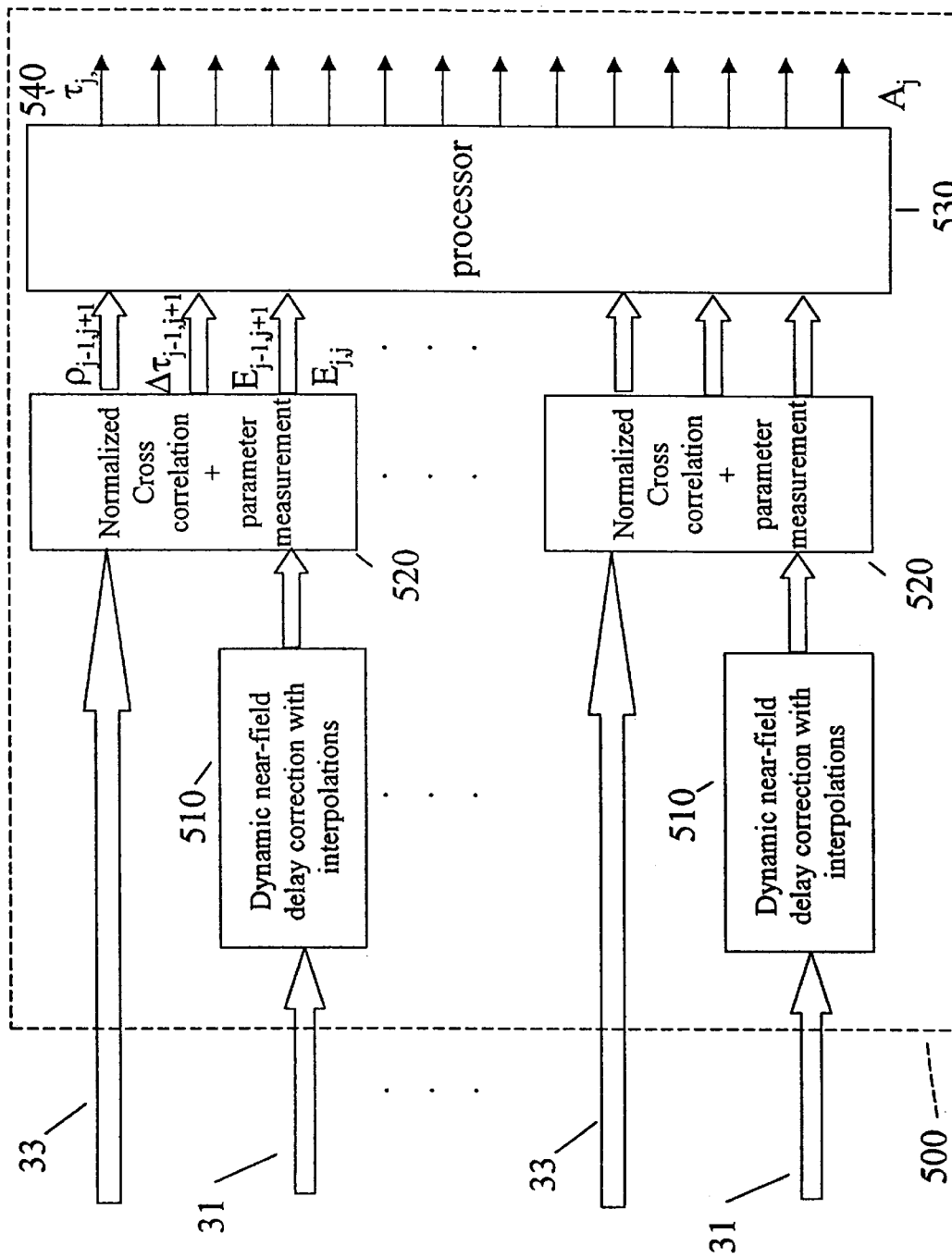
FIG. 4 is a block diagram showing the phase- and amplitude-aberration correction algorithms disclosed in the present invention.

2. Referring to FIGS. 2–4, secondly, the dynamic near-field delay correction 510 is applied to common-midpoint signals $y_{j-1,j+1}(t)$ 31 (or $y_{j+1,j-1}(t)$ 35) at the correction angle $\theta_i$ 23 to obtain signals $y'_{j-1,j+1}(\theta_i,t)$ and/or $y'_{j+1,j-1}(\theta_i,t)$ $$y'_{j+1,j-1}(\theta_i,t) = y_{j+1,j-1}[t'(\theta_i,t)] \tag{1}$$

where $$t'(\theta_i, t) = \sqrt{\left(\frac{t}{2}\right)^2 + \frac{h^2}{c_0^2} - t\frac{h}{c_0}\cos\theta_i} + \sqrt{\left(\frac{t}{2}\right)^2 + \frac{h^2}{c_0^2} + t\frac{h}{c_0}\cos\theta_i}, \tag{2}$$

j is the center element 21 index, j=2, 3, ... N−1, N is the total number of transducer elements in the transducer array 20, h is the pitch of the array, and $c_0$ is the acoustic wave propagation velocity in the medium 10.

3. The normalized cross-correlation functions between $y'_{j-1,j+1}(\theta_i,t)$ (or $y'_{j+1,j-1}(\theta_i,t)$) $y_{j,j}(t)$ are calculated 520 at a selected depth with a selected window length 22. The peak positions $\Delta\tau_{j-1,j+1}(\theta_i)$(or $\Delta\tau_{j+1,j-1}(\theta_i)$), peak values $\rho_{j-1,j+1}(\theta_i)$(or $\rho_{j+1,j-1}(\theta_i)$), and the signal energy values in the window 22 at the peak position of the cross-correlation function $E_{j,j}$, $E_{j-1,j+1}(\theta_i)$ (or $E_{j+1,j-1}(\theta_i)$) are derived.

4. The phase-aberration profiles across the array are derived 530 from $$\tau_j = \sum_{i=2}^{N-1} a_{j,i} \Delta\tau_{i-1,i+1} \qquad j = 2, 3, \ldots N-1, \tag{3}$$

$$\tau_1 = \tau_N = 0,$$

where $$a_{j,i} = \begin{cases} (i-1)\dfrac{N-j}{N-1} & i < j \\ (j-1)\dfrac{N-i}{N-1} & i \geq j \end{cases} \tag{4}$$

The measured aberration profile $\tau_j$ 540 is then sent to the transmission beam former 400 and the reception beam former 500 for aberration corrections.

5. Equation (3) is derived by assuming that the phase-aberration values for the two elements at the ends of the array 29 are zero. This assumption causes a linear-component error between the derived result $\tau_j$ and the real phase-aberration value $\tau'_j$, $$\tau'_j = \tau_j + a + b(j-1), j=1, 2, \ldots N, \tag{5}$$

where $a=\tau'_1$ and $b=(\tau'_N-\tau'_1)/(N-1)$. If $\tau'_1$ and $\tau'_N$ are small, this error is not very important. It is approximately a global rotation and shift of the image. For situations where $\tau'_1$ and $\tau'_N$ are large, it becomes important. An estimation of phase-aberration values at both ends of the array from a preliminary image with a priori knowledge. Another way to treat this situation is using a trial-and-error iterative method. Adjusting their values in the aberration-measurement system 500 and measuring the corrected image energy in the region of interest in the reception beam former 600, the optimal linear terms are obtained when the image energy in the region of interest is maximized. This is the last step of this algorithm.

There are a few methods can be used to enhance the performance of the above algorithm, which are described below.

A. One can average the two signals $y_{j-1,j+1}(t)$ 31 and $y_{j+1,j-1}(t)$ 35 first, then apply the dynamic near-field delay correction on the averaged signal and cross-correlate it with signal $y_{j,j}(t)$ 33. This can improve the signal-to-noise ratio of the cross-correlation function and as a result, improve the measurement accuracy.

B. One can perform the dynamic near-field correction 510 on signals $y_{j-1,j+1}(t)$ 31 (or $y_{j+1,j-1}(t)$ 35) with several correction angle $\theta_i$ 23 and tissue velocities $c_0$ and then, calculate the cross-correlation function 520 between the signal $y_{j,j}(t)$ 33 and each of the corrected signals separately. The peak position of the cross-correlation function with the highest cross-correlation coefficient will be used for deriving the phase-aberration profile.

C. Alternatively, one can perform the dynamic near-field correction 510 on signals $y_{j-1,j+1}(t)$ 31 (or $y_{j+1,j-1}(t)$ 35) with several correction angles $\theta_i$ 23 and tissue velocities $c_0$ and then, average these signals before cross-correlating with the signal $y_{j,j}(t)$ 33.

Figure 5:
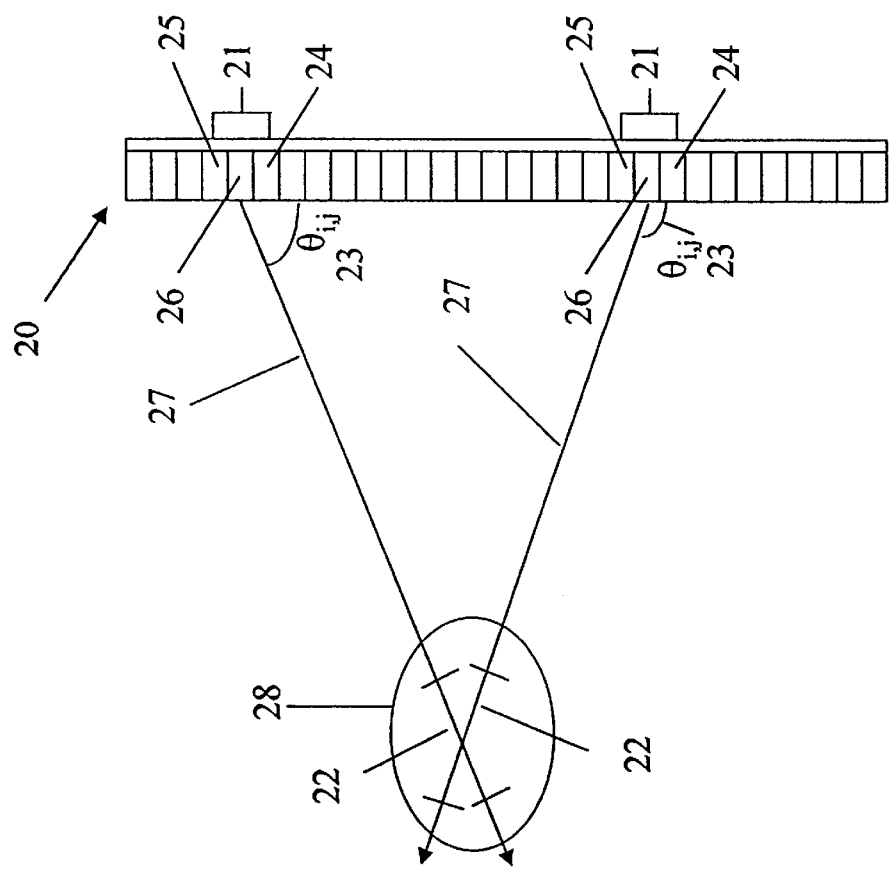
FIG. 5 is a schematic representation showing a method disclosed in the present invention. In this method, the correction angle for the dynamic near-field correction is towards the region of interest, instead of the same direction, for all common-midpoint signals collected with three neighboring elements.

D. Instead of performing the dynamic near-field correction 510 at the same angle $\theta_i$ 23 using the center element 26 as the reference as shown in FIG. 2, one can perform the dynamic near-field correction at an angle toward a region of interest 28 as shown in FIG. 5. This will optimize the aberration correction of the image in the region of interest.

E. The value of cross-correlation coefficient $\rho_j$ can be used to eliminate invalid measurement points by letting $\tau_j=0$ if $\rho_j<\rho_0$, where $\rho_0$ is a threshold. This will improve the measurement accuracy.

Figure 6:
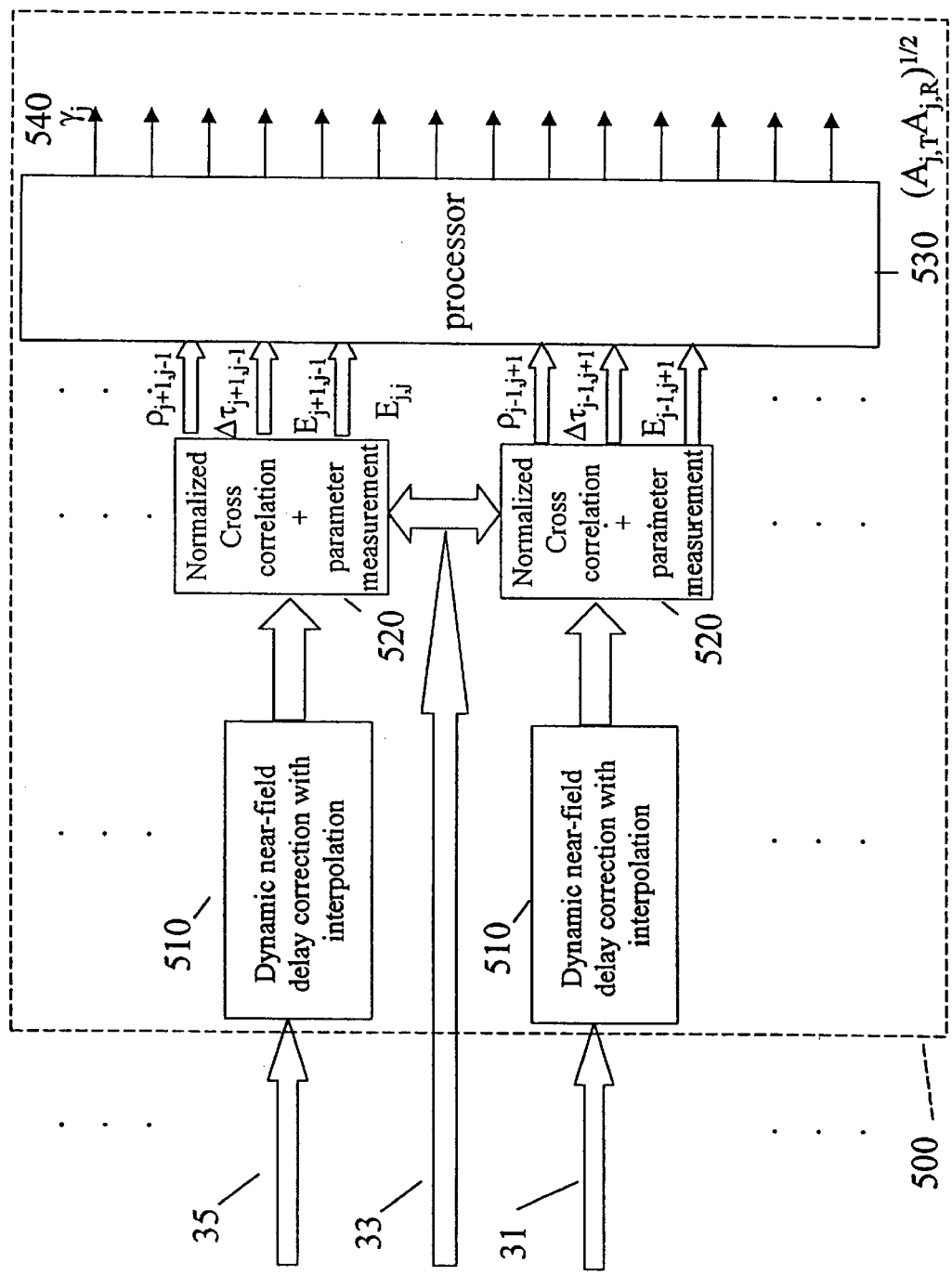
FIG. 6 is a block diagram showing the phase- and amplitude-aberration correction algorithms disclosed in the present inventions when the transmission and reception aberration profiles are different and the difference is acceptable for image formation purposes and unacceptable for aberration measurements.

II. Algorithms for Different Transmition and Reception Phase-Aberration Profiles with One-Dimensional Arrays Phase-aberration profile differences between transmission and reception are usually caused by phase differences between electronic systems in each channel in an imaging system. Since measurement errors of cross-correlation-function peak positions are magnified in the derived phase-aberration values at each element, the requirement that channels be assumed identical is much stricter for phase-aberration measurement than for image formation. Therefore, the system calibration on a commercial machine may not be accurate enough. Reciprocal signals are very useful for treating the situation of different transmission and reception phase-aberration profiles, since reciprocal signals will have a relative phase shift if phases for each channel are different and this relative phase shift is independent of the phase aberrations caused by the medium. Let $\phi_j$ and $\theta_j$ denote the transmission and reception phase aberrations of element j respectively, A. When the difference between transmission and reception aberration profiles is small enough for the purpose of image formation, there is no need to measure them separately. In this case, as shown in FIG. 6, the dynamic near-field correction 510 should be applied on signals $y_{j-1,j+1}(t)$ 31 and $y_{j+1,j-1}(t)$ 35 and then, they are cross-correlated with the signal $y_{j,j}(t)$ 33. The peak position values of $\Delta\tau_{j-1,j+1}(\theta_i)$ and $\Delta\tau_{j+1,j-1}(\theta_i)$ should be averaged and then use equation (4) to derive the phase-aberration profile in the signal processor 530. That is $$\gamma_j = \sum_{i=2}^{N-1} a_{j,i}(\Delta\tau_{j-1,j+1} + \Delta\tau_{j+1,j-1})/2 \qquad j = 2, 3, \ldots N-1 \tag{6}$$

$$\gamma_1 = \gamma_N = 0,$$

where $\gamma_j=(\phi_j+\theta_j)/2$. Since the difference between $\phi_j$ and $\theta_j$ is small, $\gamma_j$ can be used approximately for both transmission and reception phase-aberration corrections. The measured aberration profile $\gamma_j$ 540 is then sent to the transmission beam former 400 and the reception beam former 600 for aberration corrections.

Figure 7:
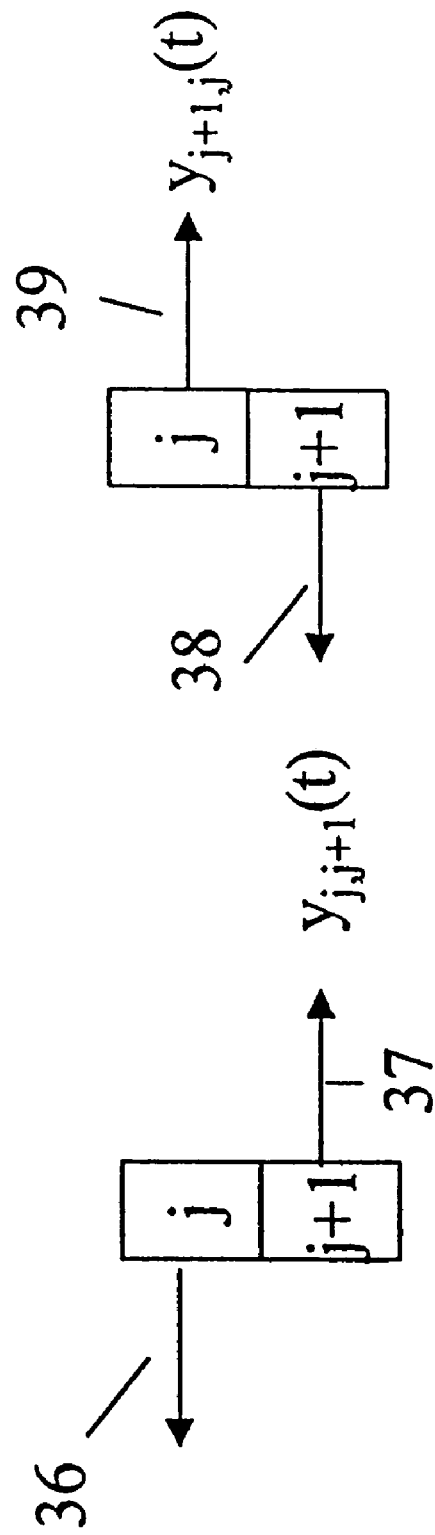
FIG. 7 is a schematic representation of the collection of two reciprocal signals with two neighboring elements.
Figure 8:
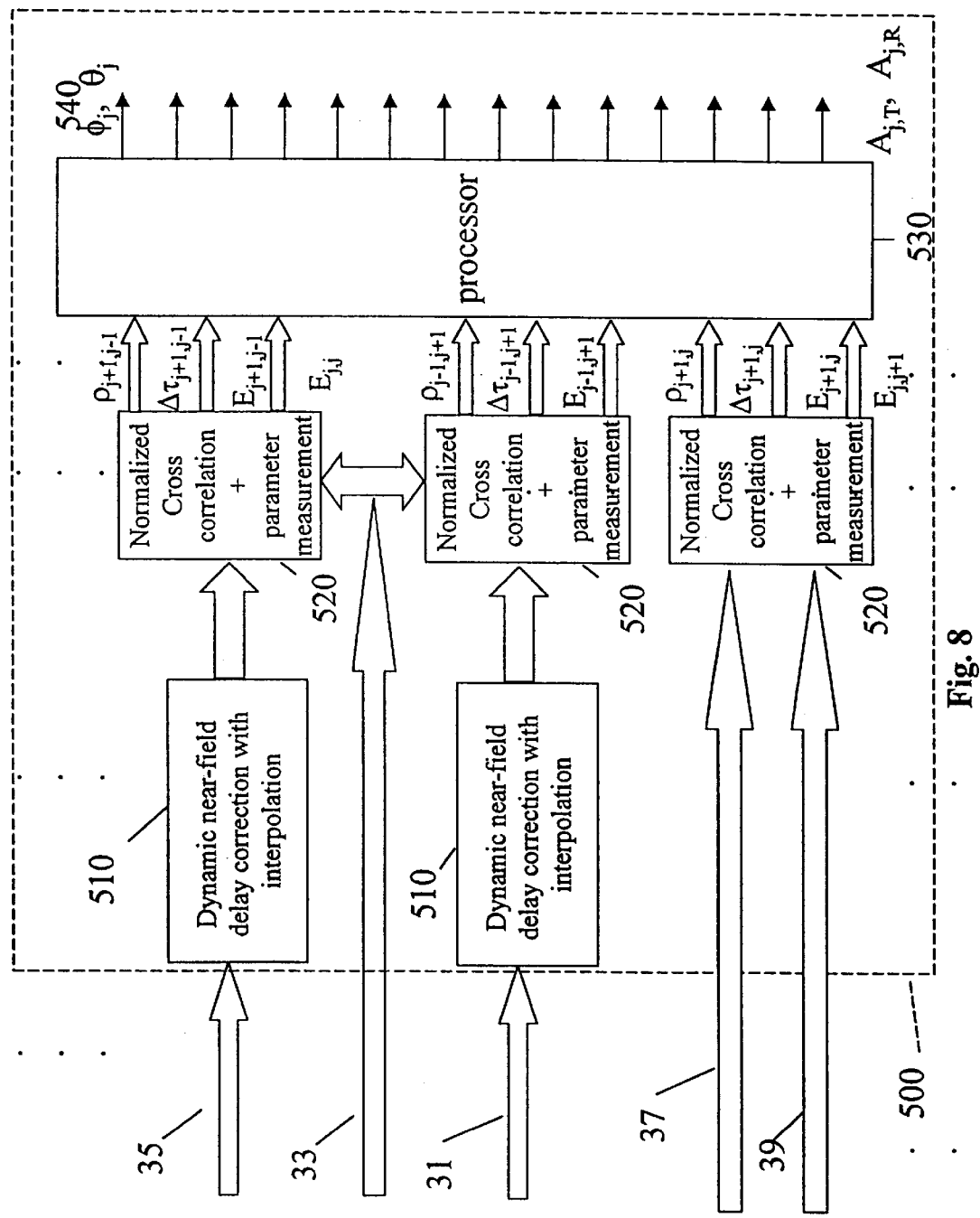
FIG. 8 is a block diagram showing the phase- and amplitude-aberration correction algorithms disclosed in the present inventions when the transmission and reception aberration profiles are different and the difference is unacceptable for both image formation and aberration measurement purposes.

B. When the difference between transmission and reception aberration profiles is large, the two phase-aberration profiles have to be measured separately. The average values $\gamma_j=(\phi_j+\theta_j)/2$ are still useful in this case. Another group of equations is also needed. The peak position $\Delta\tau_{j+1,j}$ of the cross-correlation functions between the two reciprocal signals $y_{j+1,j}(t)$ 39 and $y_{j,j+1}(t)$ 37, as shown in FIGS. 7 and 8, can be used to obtain another group of equations. The peak position $\Delta\tau_{j+1,j}$ is $$\Delta\tau_{j,j-1}=(\phi_j+\theta_{j-1})-(\phi_{j-1}+\theta_j)=\beta_{j+1}-\beta_j, j=1, 2, \ldots N-1, \tag{7}$$

where $$\beta_j=\phi_j-\theta_j. \tag{8}$$

By assuming $$\beta_1 = 0, \quad (9)$$

the profile of $\beta_j$ can be derived from $$\beta_j = \sum_{i=1}^{j-1} \Delta \tau_{i+1,i} \quad j = 2, 3, \cdots N. \quad (10)$$

From $\gamma_j$ and $\beta_j$, the phase-aberration profiles for transmission and reception are $$\phi_j = \frac{\gamma_j + \beta_j}{2} \quad (11)$$

$$\theta_j = \frac{\gamma_j - \beta_j}{2}. \quad (12)$$

The measured transmission aberration profile $\phi_j$ 540 is sent to the transmission beam former 400 and the measured reception aberration profile $\theta_j$ 540 is sent to the reception beam former 600 for aberration corrections.

III. Small-Element-Array Algorithm Using Near-Field Signal Redundancy

Figures 9, 10:
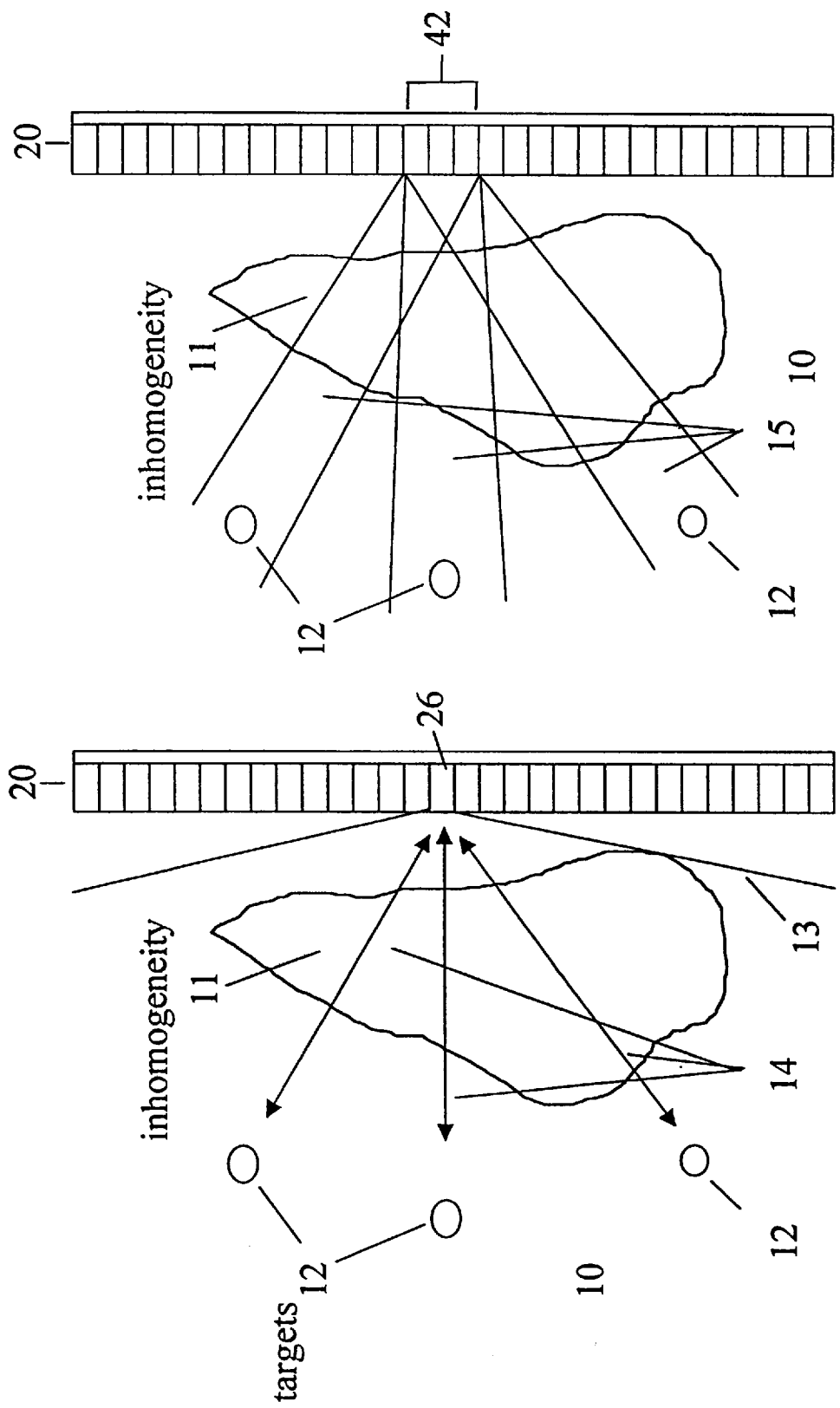
FIG. 9 is a schematic representation showing that common-midpoint signals collected with small elements may experience several aberration values when the aberration values are angle dependent.
FIG. 10 is a schematic representation showing that common-midpoint signals collected with sub-arrays can be used for measuring angle-dependent aberration profiles.

An important issue that influences the performance of the near-field signal-redundancy algorithm is the degree of validity of the "phase screen on the transducer surface" model for the effect of aberrators in the medium. For small-element arrays, one may have the following problem: each element 26 transmits signals into and receives echoes from a wide angular range 13, and these echoes 14 may experience different phase-aberration values, as shown in FIG. 9; in this case, the peak position of the cross-correlation function between common-midpoint signals is not directly related to the phase-aberration value at any particular direction. A narrower beam, which limits the transmitted signals and received echoes to a smaller angular range, may help to make the transmitted and received beams experience approximately a single aberration value, and make it possible to measure a phase-aberration profile. In this case, the measured aberration profiles may be different at different beam angles; therefore, several aberration profiles may need to be measured. When using these measured profiles to correct the image, one may use each profile for the correction of the image in the corresponding direction.

In this invention, it is disclosed that one can group small elements into sub-arrays 42 to collect common-midpoint signals with the required narrow directivity pattern 15, and the beam angle of sub-arrays can be steered in different directions 15 to measure the phase-aberration values for each direction, as shown in FIG. 10. The phase-aberration-correction algorithm using near-field signal redundancy for small-element arrays includes the following steps.

Figure 11:
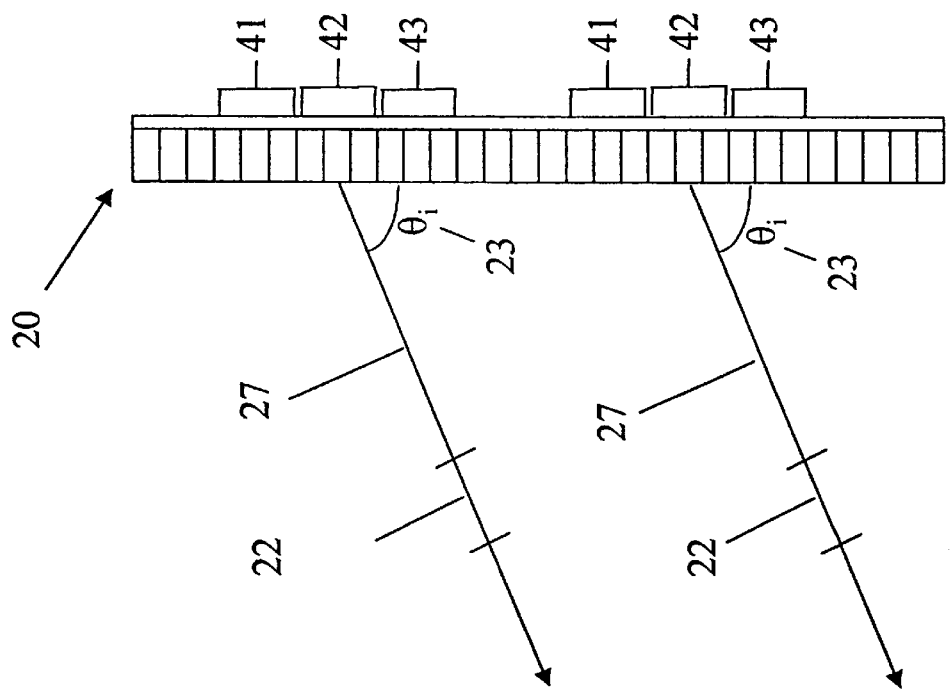
FIG. 11 is a schematic representation of the transducer array, the three neighboring sub-arrays used to collect common-midpoint signals, the correction angle for the dynamic near-field correction, the depth and width of the cross-correlation window for implementing the sub-array algorithm disclosed in the present invention.
Figure 12:
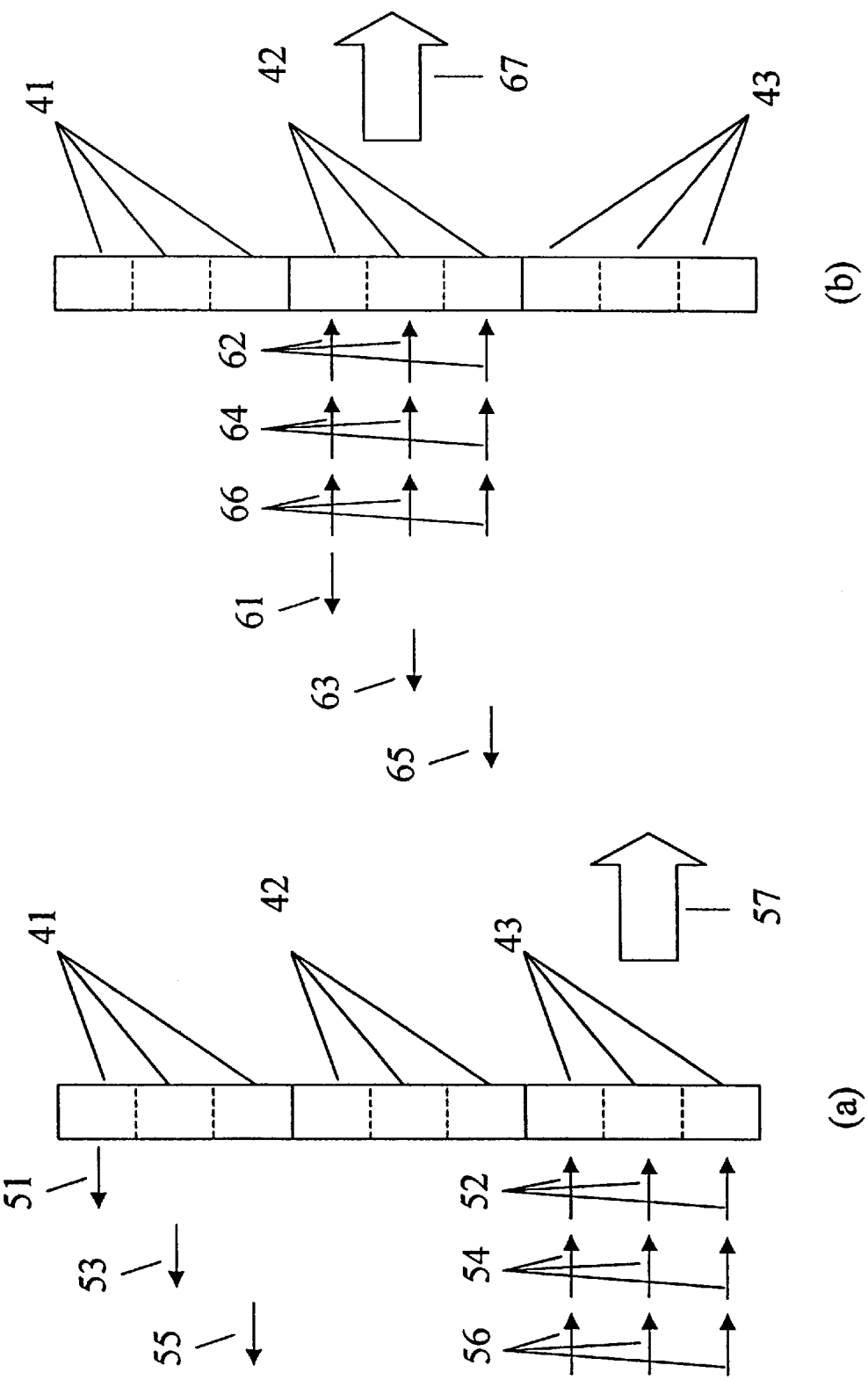
FIG. 12 is a schematic representation of the generation of two groups of received signals from three neighboring sub-arrays collected by transmitting from one element at a time. These signals will be used to form common-midpoint signals collected with sub-arrays.
Figure 13:
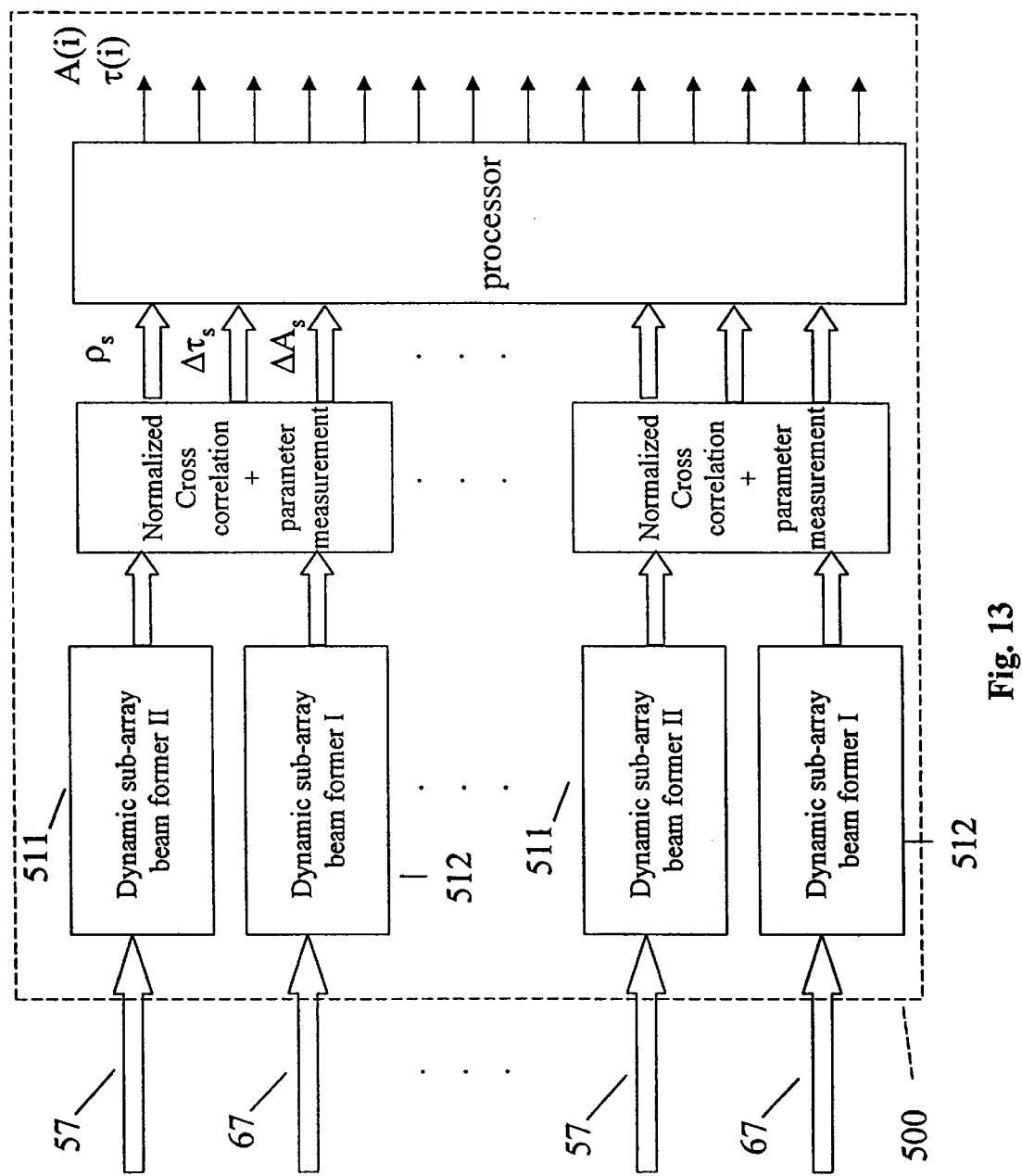
FIG. 13 is a block diagram showing the sub-array phase- and amplitude-aberration correction algorithms disclosed in the present inventions for measuring and correcting angle-dependent aberration profiles.

1. First, a data set $y_{k,1}(t)$ is collected by transmitting on all elements, one at a time, and receiving at several elements for each transmission, where k is the transmission element index and l is the reception element index. The number of receiving elements for each transmission depends on the number of elements n in each sub-array.
2. Second, referring to FIGS. 11—13, the signal y'$_{s,s}$(s, $\theta_i$, t) 67, where s is the sub-array index, is formed with dynamic sub-array beam former I 512 using all signals transmitted from transducer elements, 61, 63, 65, in the center sub-array 42 and received at all elements, 62, 64, 66, in the center sub-array 42 at the steering angle $\theta_i$. The signals y'$_{s-1,s+1}$(s, $\theta_i$, t) 57 (or y'$_{s+1,s-1}$(s, $\theta_i$, t)) is formed with dynamic sub-array beam former II 511 using all signals transmitted from transducer elements, 51, 53, 55, in the upper sub-array 41 and received at all elements, 52, 54, 56, in the lower sub-array 43 at the steering angle $\theta_i$. Assume that each sub-array has n transducer elements, the total number of sub-arrays is S, and the total number of transducer elements in the array is N=Sn, then $$y'_{s,s}(s,\theta_i,t) = \frac{1}{n^2} \sum_{k=sn-n+1}^{sn} \sum_{l=sn-n+1}^{sn} y_{kl}[t'_{kl}(s,\theta_i,t)] \quad (13)$$

$$s = 2, 3, \ldots S-1$$

and $$y'_{s-1,s+1}(s,\theta_i,t) = \frac{1}{n^2} \sum_{k=sn+1}^{sn+n} \sum_{l=sn-2n+1}^{sn-n} y_{kl}[t'_{kl}(s,\theta_i,t)], \quad (14)$$

$$s = 2, 3, \ldots S-1,$$

where $$t'_{kl}(s,\theta_i,t) = \quad (15)$$

$$\sqrt{\left(\frac{t}{2}\right)^2 + \left(k - sn + \frac{n-1}{2}\right)^2 \frac{h^2}{c_0^2} - \left(k - sn + \frac{n-1}{2}\right)\frac{th}{c_0}\cos\theta_i} +$$

$$\sqrt{\left(\frac{t}{2}\right)^2 + \left(l - sn + \frac{n-1}{2}\right)^2 \frac{h^2}{c_0^2} - \left(l - sn + \frac{n-1}{2}\right)\frac{th}{c_0}\cos\theta_i}.$$

The steering angle $\theta_i$ 23 is step through the angular range of the image and a set of common-midpoint signals is obtained for each steering angle. The increment of each step may depend on the beam width.

1. The third step is to measure the peak position $\Delta \tau_s(\theta_i)$(s= 2,3, . . . S−1) of cross-correlation functions between common-midpoint signals y'$_{s,s}$(s, $\theta_i$, t) and y'$_{s-1,s+1}$(s, $\theta_i$, t)(or y'$_{s+1,s-1}$(s, $\theta_i$, t)) in 520. Then the phase-aberration profiles across the array at all directions $\tau_s(\theta_i)$ can be derived using (3) 530. The derived phase aberration value for each sub-array should be assigned to all elements in the sub-array to obtain $\tau_j(\theta_i)$ from $\tau_s(\theta_i)$. The measured aberration profile $\tau_j(\theta_i)$ 540 is then sent to the transmission beam former 400 and the reception beam former 500 for aberration corrections.

Figure 14:
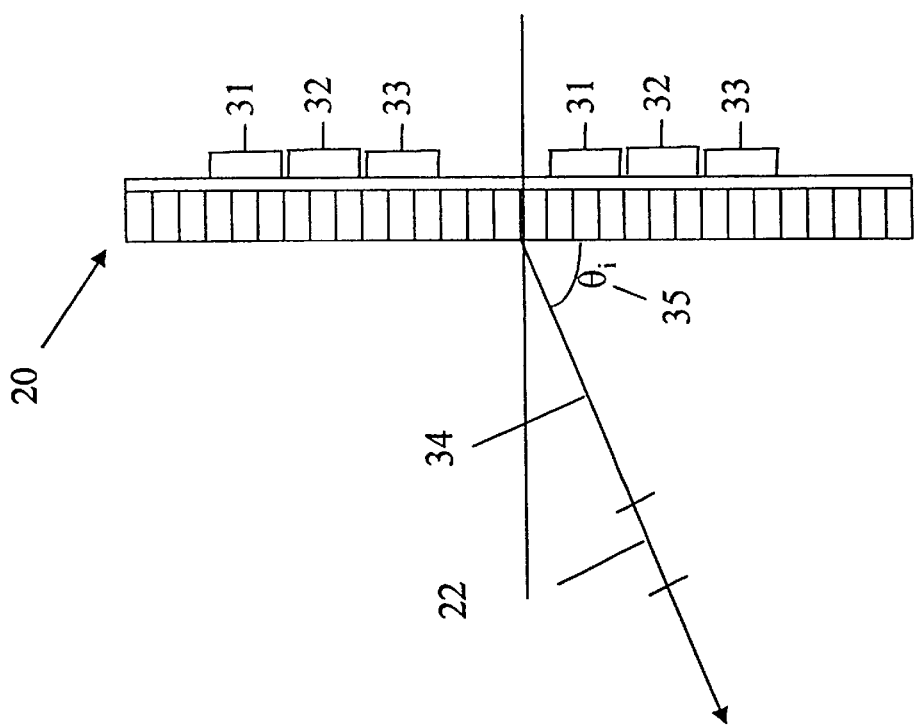
FIG. 14 is a schematic representation showing a sub-array method disclosed in the present invention. In this method, common-midpoint signals collected with sub-arrays are formed along an image line, instead of along the same direction, for all common-midpoint signals collected with three neighboring sub-arrays.

The derived profiles $\tau_j(\theta_i)$ at different steering angles $\theta_i$ may have different undetermined linear components. For a small aperture array or an image pixel, which is far from the transducer, where the angle of an image pixel to all elements in the array is about the same, this angle-dependent undetermined linear term generally does not influence the focusing. But it may cause image distortion if the linear term is very different for different angles. For a large-aperture array or an image pixel, which is near the transducer, however, phase-aberration values measured at different angles may be used at the same image pixel, and therefore, if possible, it is important to estimate the linear terms, when they are very different for different angles. However, it is usually difficult to estimate these linear terms. Therefore, another method is proposed here to solve this problem. It measures a phase-aberration profile for each image line 34 instead of each angle 27, as shown in FIG. 14. In this case, y'$_{s,s}$(s, $\theta_i$, t) 67 and y'$_{s-1,s+1}$(s, $\theta_i$, t) 57 (or y'$_{s+1,s-1}$(s, $\theta_i$, t)) are still as expressed in (13) and (14), but t'$_{k1}$(s, $\theta_i$, t) in (15) becomes $$t'_{kl}(s, \theta_i, t) =$$ (16)

$$\sqrt{\left(\frac{t}{2}\right)^2 + \left(k - 1 - \frac{N-1}{2}\right)^2 \frac{h^2}{c_0^2} - \left(k - 1 - \frac{N-1}{2}\right)\frac{th}{c_0}\cos\theta_i} +$$

$$\sqrt{\left(\frac{t}{2}\right)^2 + \left(l - 1 - \frac{N-1}{2}\right)^2 \frac{h^2}{c_0^2} - \left(l - 1 - \frac{N-1}{2}\right)\frac{th}{c_0}\cos\theta_i}.$$

That is, each sub-array forms a beam along each image line 34, and a phase-aberration-profile measurement is made from common-midpoint signals formed for each image line 34. In this case, the focus quality of each pixel is not influenced by the undetermined linear phase-aberration profiles. However, the image may still be distorted if the undetermined linear terms are very different at different image-line angles 35.

There are a few methods can be used to enhance the performance of the above algorithms, which are described below.

A. The number of elements in each sub-array should be chosen so that the required directivity or beam width, which is determined by the estimated changing rate of the phase-aberration value with angles, is achieved. However, this is also difficult to estimate. A trial-and-error approach may be used by forming common-midpoint signals with several sub-array sizes n.

B. When forming beams using each sub-array for the phase-aberration measurement, resolution is not critical. Therefore, one can use apodization to concentrate more signal energy around the correction angle by reducing energy leakage to side lobes. This is helpful to make echoes from the region around the correction angle be dominant in common-midpoint signals.

C. Since the aperture of each sub-array is relatively small, the effective aperture concept may be valid for beam patterns. Therefore one may also use only part of the available signals (one signal for each midpoint) with appropriate weighting to form a beam that has the desired beam pattern. This can reduce the computation load of this algorithm. But the signal-to-thermal-noise ratio will be lower than that when all the signals are used.

IV. Two-Dimensional Array Algorithm Using Nrear-Field Signal Redundancy

Figure 15:
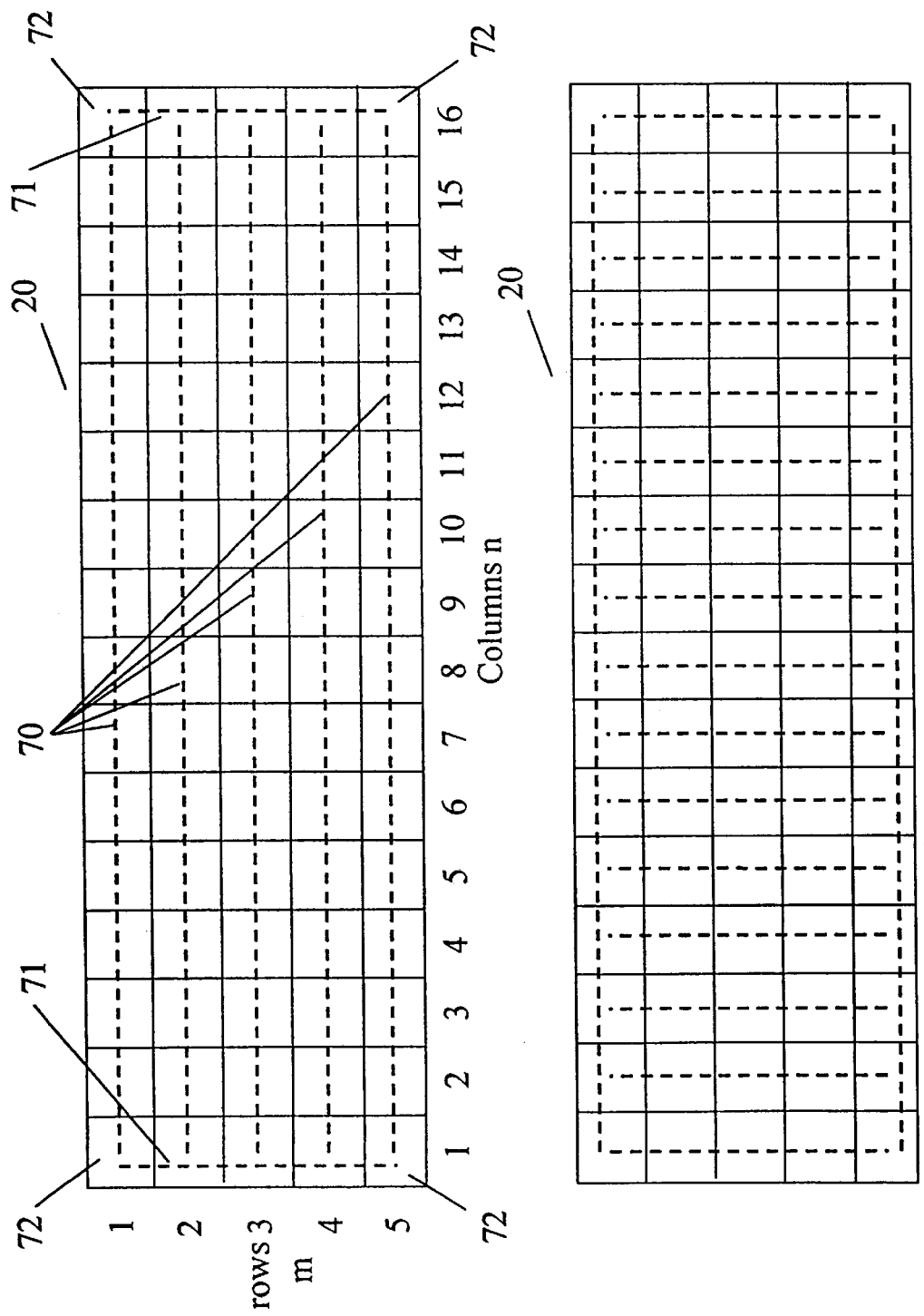
FIG. 15 is a schematic representation showing a two-dimensional array and the all-row-plus-two-column as well as the all-column-plus-two-row algorithms disclosed in the present invention for measuring phase- and amplitude-aberration profiles on a two-dimensional array.

The principle of phase aberration correction algorithm developed above for a one-dimensional array can be applied to two-dimensional arrays 20, as shown in FIG. 15. However, this is not straightforward. There are new problems and opportunities when they are applied on a two-dimensional array and these are discussed below.

A. The Algorithm for Identical Transmission and Reception Phase Aberration Profiles First, assuming transmission and reception phase aberration profiles are identical, let $\phi_{m,n}$ where m=1,2, . . . M and n=1,2, . . . N, denotes the phase-aberration value for element (m, n), as shown in FIG. 15. The profile can be derived by applying the algorithm for one-dimensional array on rows and columns, then combining these results together carefully. The method proposed in the present invention is as follows.

One can first apply the algorithm for one-dimensional array on all rows 70. The result of each row is solved by assuming the phase values at both ends of each row are zero. The results are $$\phi'_{m,n} = \phi_{m,n} + a'_m + b'_m(n-1) \quad m=1,2,\ldots M \; n=1,2,\ldots N,$$ (17)

where $$a^r_m = -\phi_{m,1}$$ (18)

$$b^r_m = -\frac{\phi_{m,N} - \phi_{m,1}}{N - 1}.$$

$\phi'_{m,n}$ is the derived profile, $\phi_{m,n}$ is the real profile, $a^r_m$ and $b^r_m$ are the arbitrary linear terms for row measurements. The arbitrary linear terms are generally different for different rows. There are 2M undetermined parameters in (17).

To reduce the unknown parameters, one can apply the one-dimensional algorithm again on two columns, such as choosing the first and the last columns 71. The results for these two columns are:

Column 1:

$$\phi^c_{m,1} = \phi_{m,1} + a^c_1 + b^c_1(m-1) \quad m=1,2,\ldots M,$$ (19)

where $$a^c_1 = -\phi_{1,1}$$ (20)

$$b^c_1 = -\frac{\phi_{M,1} - \phi_{1,1}}{M - 1};$$

Column N:

$$\phi^c_{m,N} = \phi_{mN} + a^c_N + b^c_N(m-1) \quad m=1,2,\ldots M,$$ (21)

where $$a^c_N = -\phi_{1,N}$$ (22)

$$b^c_N = -\frac{\phi_{M,N} - \phi_{1,N}}{M - 1}.$$

$a^c_1, b^c_1, a^c_N$ and $b^c_N$ are the arbitrary linear terms for column measurements.

From the two column results, a linear term can be derived for each of the row measurement results. After adding the linear terms, the resulted profile should match the result obtained from columns 1 and N at the first and last columns 71. This new profile is:

$$\phi^{r,c}_{m,n} = \phi'_{m,n} + a_m + b_m(n-1) \quad m=1,2,\ldots M \; n=1,2,\ldots N,$$ (23)

where:

$$a_m = \phi^c_{m,1}$$ (24)

$$b_m = \frac{\phi^c_{m,N} - \phi^c_{m,1}}{N - 1}.$$

The number of arbitrary parameters in equation (23) is four: $a^c_1, b^c_1, a^c_N$ and $b^c_N$ in (20) and (22). If these four values are known, the real aberration profile can be obtained. The solution of equation (23) is derived by assuming that the phase aberration values at the four elements at the four corners of the array 72 are zero. Generally, these four points are not on the same plane, which results in an undetermined curved plane difference between the measured and real aberration profiles, which, unlike in the one-dimensional case, will certainly influence the focusing quality of the imaging system. To make the undetermined curved plane into a flat plane, which has smaller influence on the focusing quality, an iterative approach can be used. One of the four undetermined parameters a, $a_N$, $b_1$ and $b_N$ is adjusted, and the resulted profiles are sent to the transmission beam former 400 and the reception beam former 500 for aberration corrections. The image energy in the region of interest in the reception beam former 600 is measured for each profile. The optimal value of the undetermined parameter is obtained when the image energy in the region of interest is maximized.

B. Different Transmission and Reception Phase-Aberration Profiles

Let $\phi_{m,n}$ and $\theta_{m,n}$ denote the transmission and reception aberration profiles respectively at element (m, n), where n=1,2, ... N, and m=1,2, ... M. If the difference between $\phi_{m,n}$ and $\theta_{m,n}$ is small for image formation purposes, (6) and the method for identical transmission and reception algorithm described in the last section A can be used. If the difference between $\phi_{m,n}$ and $\theta_{m,n}$ is large for image formation purposes, they have to be measured separately. The one-dimensional algorithm for dealing with this problem (7)–(12) can also be applied to all rows 70 plus two columns, such as the two columns at the end of the array 71. It can be shown that the results from rows are $$\phi^r_{m,n} = \phi_{m,n} + a^r_{\phi,m} + b^r_m(n-1) \quad m=1,2,\ldots M \quad n=1,2,\ldots N, \quad (25)$$

$$\theta^r_{m,n} = \theta_{m,n} + a^r_{\theta,m} + b^r_m(n-1) \quad m=1,2,\ldots M \quad n=1,2,\ldots N, \quad (26)$$

where $$a^r_{\phi,m} = -\phi_{m,1} \quad (27)$$

$$a^r_{\theta,m} = -\theta_{m,1}$$

$$b^r_m = -\frac{(\phi_{m,N} - \phi_{m,1}) + (\theta_{m,N} - \theta_{m,1})}{N-1}.$$

There are three undetermined parameters in the results for each row, and 3M undetermined parameters in total. The results from column 1 are $$\phi^c_{m,1} = \phi_{m,1} + a^c_{\phi,1} + b^c_1(m-1) \quad M=1,2,\ldots M$$

$$\theta^c_{m,1} = \theta_{m,1} + a^c_{\theta,1} + b^c_1(m-1) \quad m=1,2,\ldots M, \quad (28)$$

where $$a^c_{\phi,1} = -\phi_{1,1} \quad (29)$$

$$a^c_{\theta,1} = -\theta_{1,1}$$

$$b^c_1 = -\frac{(\phi_{M,1} - \phi_{1,1}) + (\theta_{M,1} - \theta_{1,1})}{M-1}.$$

The results from column N are $$\phi^c_{m,N} = \phi_{m,N} + a^c_{\phi,N} + b^c_N(m-1) \quad m=1,2,\ldots M \quad (30)$$

$$\theta^c_{m,N} = \theta_{m,N} + a^c_{\theta,N} + b^c_N(m-1) \quad m=1,2,\ldots M, \quad (31)$$

where $$a^c_{\phi,N} = -\phi_{1,N} \quad (32)$$

$$a^c_{\theta,N} = -\theta_{1,N}$$

$$b^c_N = -\frac{(\phi_{M,N} - \phi_{1,N}) + (\theta_{M,N} - \theta_{1,N})}{M-1}.$$

$a^c_{\phi,1}$, $a^c_{\theta,1}$, $b^c_1$, $a^c_{\phi,N}$, $a^c_{\theta,N}$, and $b^c_N$ are the arbitrary linear terms for column measurements.

The next step is to link the row results and the two column results together to reduce the unknown parameters. Here, it is done differently from the identical transmission and reception aberration profiles case. The slope of added linear terms, derived from the two column results, should be the same for both $\theta$ and $\phi$, so that the undetermined planes for them are the same, which will reduce the influence of the undetermined planes on the image quality. To do that, the slope of the added linear term to row m is the average of the slopes for $\theta$ and $\phi$ $$b'_m = \frac{(\phi^c_{m,N} - \phi^c_{m,1}) + (\theta^c_{m,N} - \theta^c_{m,1})}{2(N-1)} \quad m=1,2,\ldots M, \quad (33)$$

and the resulted profiles are $$\phi^{r,c}_{m,n} = \phi^r_{m,n} + \phi^c_{m,1} + b'_m(n-1) \quad m=1,2,\ldots M \quad n=1,2,\ldots N \quad (34)$$

$$\theta^{r,c}_{m,n} = \theta^r_{m,n} + \theta^c_{m,1} + b'_m(n-1) \quad m=1,2,\ldots M \quad n=1,2,\ldots N. \quad (35)$$

Because of using (33), the six undetermined parameters $a^c_{\phi,1}$, $a^c_{\theta,1}$, $b^c_1$, $a^c_{\phi,N}$, $a^c_{\theta,N}$, and $b^c_N$ in (34) and (35) have been reduced to four parameters $a^c_{\phi,1} + a^c_{\theta,1}$, $b^c_1$, $a^c_{\phi,N} + a^c_{\theta,N}$, and $b^c_N$. As is in the case of identical transmission and reception profiles, the four undetermined parameters result in an undetermined curved plane difference between the measured and the real aberration profiles, which is the same for both $\phi$ and $\theta$ profiles. To make the undetermined curved plane into a flat plane, one of the four undetermined parameters is adjusted, and the resulted profiles are sent to the transmission beam former 400 and the reception beam former 500 for aberration corrections. The image energy in the region of interest in the reception beam former 600 is measured for each profile. The optimal value of the undetermined parameter is obtained when the image energy in the region of interest is maximized.

C. Increase the Signal to Noise Ratio

For a two-dimensional array, two independent measurements, which have similar accuracy, can be performed. Such as, one measurement is performed with all rows plus two columns and another is performed with all columns plus two rows, as shown in FIG. 15. These two measurements can be averaged to improve the measurement accuracy.

V. Amplitude-Aberration Correction Algorithms Using Near-Field Signal Redundancy Amplitude aberrations caused by attenuation inhomogeneity in a medium or system errors is another limit on imaging system performance. Even though imaging systems are less sensitive to amplitude aberrations than they are to phase aberrations, when amplitude aberrations are severe, they must be corrected to obtain a good quality image.

The method herein proposed uses the near-field signal redundancy principle, which is also used in the phase-aberration correction algorithm discussed hereinbefore. In a homogeneous medium, when the distance between three neighboring elements is small compared with the target distance, common midpoint signals are approximately redundant for targets in the near-field after the dynamic near-field correction, and this should be true in terms of both phase and amplitude. When the medium is inhomogeneous in terms of attenuation, the amplitude of common-midpoint signals will become different and it provides a method for measuring and correcting amplitude aberrations.

Since signal redundancy principle for amplitude is much less affected by the fact that targets are in the near field compared with that for phase, and the measurement accuracy requirement is also lower, common-midpoint signals may not need dynamic near-field corrections for amplitude-aberration measurement. This will reduce the computation load for amplitude-aberration measurements. But, when both amplitude and phase aberrations exist, the amplitude-aberration and the phase-aberration measurements can be performed together after common-midpoint signals are dynamically corrected.

In the phase-aberration correction algorithm described hereinbefore, there is a step for calculating normalized cross-correlation functions and measuring their peak positions (step 3 in section I). The signal energies used to normalize the cross-correlation functions at its peak position $E_{j,j}$, $E_{j-1,j+1}(\theta_i)$ (or $E_{j+1,j-1}(\theta_i)$), as shown in FIGS. 4, 6, and 8, can be used directly for amplitude-aberration measurements. These energies are calculated with the common-midpoint signals, which are dynamically corrected with a high sampling rate, and phase shifted to compensate for phase aberrations.

The energy of the received signal $y_{j,j}(t)$ 26 in the cross-correlation window from time $t_1$ to $t_2$ 22 is $$E_{j,j} = \int_{t_1}^{t_2} y_{j,j}^2(t) dt = A_{j,T}^2 A_{j,R}^2 \int_{t_1}^{t_2} z^2(t) dt, \tag{36}$$

where $z(t)$ are the normalized signal of $y_{j,j}(t)$ with unit amplitude, which is approximately the same for common-midpoint signals, $A_{j,R}$ and $A_{j,T}$ are transmission and reception amplitude sensitivities. When the amplitude-screen model is valid, $A_{j,R}$ and $A_{j,T}$ include both system and medium amplitude aberrations. For the signals $y'_{j-1,j+1}(t)$ 31 and $y'_{j+1,j-1}(t)$ 35

$$E_{j-1,j+1} = \int_{t_1}^{t_2} y_{j-1,j+1}^2(t) dt = A_{j-1,T}^2 A_{j+1,R}^2 \int_{t_1}^{t_2} z^2(t) dt \tag{37}$$

$$E_{j+1,j-1} = \int_{t_1}^{t_2} y_{j+1,j-1}^2(t) dt = A_{j+1,T}^2 A_{j-1,R}^2 \int_{t_1}^{t_2} z^2(t) dt. \tag{38}$$

The following discusses algorithms for measuring amplitude-aberration profiles.

A. Algorithm for Identical Transmission and Reception Amplitude-Aberration Profiles In this case, from (37) and (38), $E_{j+1,j-1} = E_{j-1,j+1}$, and the measurements of the two values can be average to reduce the influence of noise. The logarithm of the square-root of the energy ratio $h_j$ $$h_j = \log_{10} \sqrt{\frac{E_{j,j}}{E_{j-1,j+1}}} = \log_{10} \frac{A_j^2}{A_{j-1} A_{j+1}} \tag{39}$$

can be used for the measurement. Let $$\alpha_j = \log_{10} A_j \tag{40}$$

then (39) becomes $$2\alpha_j - \alpha_{j-1} - \alpha_{j+1} = h_j, j = 2, 3, \ldots N-1. \tag{41}$$

The profile of $\alpha_j$ can be derive from (41) by assuming $$\alpha_1 = \alpha_N = 0, \tag{42}$$

which is equivalent to assuming $$A_1 = A_N = 1. \tag{43}$$

The derived profile is $$\alpha_j = \alpha'_j + a + b(j-1), \tag{44}$$

where $\alpha'_j$ is the real profile, and $$a = -\alpha'_1 \tag{45}$$

$$b = -\frac{\alpha'_N - \alpha'_1}{N-1}.$$

From (40), (44) and (45), the relationship between the measured amplitude profile $A_j$ and the real profile $A'_j$ is $$A_j 10^{\alpha_j} = \frac{A'_j}{A'_1} \left(\frac{A'_1}{A'_N}\right)^{\frac{j-1}{N-1}} \quad j = 1, 2, \ldots N. \tag{46}$$

Therefore, the measured amplitude value $A_j$ is the real profile $A'_j$ normalized by $A'_1$ and weighted by a factor which depends on the element number N. The influence of the weighting factor is equivalent to an apodization window. The values of $A_1$ and $A_N$ may be adjusted to reduce its effect. The measured aberration profile $A_j$ 540 is then sent to the transmission beam former 400 and the reception beam former 500 for aberration corrections, as shown in FIG. 4.

B. Algorithm for Different Transmission and Reception Amplitude Aberration Profiles When the amplitude-aberration profiles are different for transmissions and receptions, $E_{j-1,j+1}$ will not equal to $E_{j+1,j-1}$. Let $$h_j = \log_{10} \sqrt{\frac{E_{j,j}}{E_{j-1,j+1}}} + \log_{10} \sqrt{\frac{E_{j,j}}{W_{j+1,j-1}}}, \tag{47}$$

and $$\alpha_j = \log_{10}(A_{j,R} A_{j,T}). \tag{48}$$

Then (41)–(45) are still valid, and (46) becomes $$A_{j,T} A_{j,R} = 10^{\alpha_j} = \frac{A'_{j,T} A'_{j,R}}{A'_{1,T} A'_{1,R}} \left(\frac{A'_{1,T} A'_{1,R}}{A'_{N,T} A'_{N,R}}\right)^{\frac{j-1}{N-1}} \tag{49}$$

$$j = 1, 2, \ldots N.$$

If the difference between the transmission and reception profiles is small for image-formation purposes, there is no need to separate them. One can use the geometric mean of the transmission and reception amplitude-aberration profiles $$\sqrt{A_{j,T} A_{j,R}} = 10^{\frac{\alpha_j}{2}} = \sqrt{\frac{A'_{j,T} A'_{j,R}}{A'_{1,T} A'_{1,R}} \left(\frac{A'_{1,T} A'_{1,R}}{A'_{N,T} A'_{N,R}}\right)^{\frac{j-1}{N-1}}} \tag{50}$$

$$j = 1, 2, \ldots N$$

for both transmission and reception aberration corrections by sending it to the transmission beam former 400 and the reception beam former 500, as shown in FIG. 6.

When the difference between the transmission and reception profiles is large, them must be measured separately. To separate the transmission and reception amplitudes, another group of equations is needed. It can be obtained from the two reciprocal signals $y_{j,j+1}(t)$ 37 and $y_{j+1,j}(t)$ 39 collected by using two neighboring elements.

$$E_{j,j+1} = \int_{t_1}^{t_2} y_{j,j+1}^2(t)dt = A_{j,T}^2 A_{j+1,R}^2 \int_{t_1}^{t_2} z^2(t)dt \quad (51)$$

$$j = 1, 2, \ldots N-1$$

$$E_{j+1,j} = \int_{t_1}^{t_2} y_{j+1,j}^2(t)dt = A_{j+1,T}^2 A_{j,R}^2 \int_{t_1}^{t_2} z^2(t)dt$$

$$j = 1, 2, \ldots N-1.$$

Note that $y_{j,j+1}(t)$ 37 and $y_{j+1,j}(t)$ 39 are identical even without the dynamic near-field correction. Energy values can also be obtained from the process of calculating the normalized cross-correlation function when measuring the different transmission and reception phase-aberration profiles. Let $$m_j = \log_{10}\sqrt{\frac{E_{j,j+1}}{E_{j+1,j}}} \quad (52)$$

$$\beta_j = \log_{10}\left(\frac{A_{j,R}}{A_{j,T}}\right), \quad (53)$$

then $$\beta_{j+1} - \beta_j = m_j, j=1,2,\ldots N-1. \quad (54)$$

(54) can be solved by assuming $\beta_1 = 0$, that is $A_{1,R} = A_{1,T}$. The result is $$\beta_j = \sum_{i=1}^{j-1} m_i \quad j = 2, 3, \ldots N. \quad (55)$$

The derived $\beta_j$ profile and the real profile $\beta'_j$ are linked by $$\beta_j = \beta'_j + \alpha_1, \quad (56)$$

where $$\alpha_1 = -\beta'_1. \quad (57)$$

From $\alpha_j$ and $\beta_j$, the transmission and reception amplitudes can be derived from $$A_{j,T} = 10^{\frac{(\alpha_j - \beta_j)}{2}} \quad j = 1, 2, \ldots N \quad (58)$$

$$A_{j,R} = 10^{\frac{(\alpha_j + \beta_j)}{2}} \quad j = 1, 2, \ldots N. \quad (59)$$

It can be shown that the measured profiles $A_{j,T}$ and $A_{j,R}$ are related to the real profiles $A'_{j,T}$ and $A'_{j,R}$ by $$A_{j,T} = \frac{A'_{j,T}}{A'_{1,T}}\left(\sqrt{\frac{A'_{1,T}A'_{1,R}}{A'_{N,T}A'_{N,R}}}\right)^{\frac{j-1}{N-1}} \quad j = 1, 2, \ldots N \quad (60)$$

$$A_{j,R} = \frac{A'_{j,R}}{A'_{1,R}}\left(\sqrt{\frac{A'_{1,T}A'_{1,R}}{A'_{N,T}A'_{N,R}}}\right)^{\frac{j-1}{N-1}} \quad j = 1, 2, \ldots N. \quad (61)$$

It is shown that the measured amplitude profiles are the real profiles normalized by the value at the first element and apodized by a window, which is the same for both transmission and reception aberration profiles. The measured transmission aberration profile $A_{j,T}$ 540 is sent to the transmission beam former 400 and the measured reception aberration profile $A_{j,R}$ 540 is sent to the reception beam former 600 for aberration corrections, as shown in FIG. 8.

C. Two-Dimensional Array Amplitude-Aberration Measurements

Amplitude-aberration measurements for a two-dimensional array are similar to the phase-aberration measurements described before. One can apply the one-dimensional array algorithm to all rows plus two columns, or to all columns plus two rows, then link the results together carefully.

D. Using Less Accurate Redundant Signals

The amplitude-aberration correction can be incorporated into the phase-aberration correction algorithm. In phase-aberration measurements, signal energies can be measured with signals used for phase-aberration measurements, which are dynamically corrected at high sampling rate. It costs very little to use these high accuracy signals for amplitude-aberration measurement.

But generally, amplitude-aberration measurements can be performed using much less accurate signals, since signal amplitude redundancy is much less sensitive to the fact that targets are in the near field compared with the phase redundancy. The measurement-accuracy requirement is also not as high as that for phase-aberration measurement. Therefore, the following signals may be used for amplitude-aberration measurements if it is needed:

1) signals without the dynamic near-field correction.
2) demodulated signals.
3) signals with low sampling rate.

VI. Noise Control In Aberration-Measurement Algorithms

The differences between transmission and reception aberration profiles are generally caused by system errors. Since the requirement for them to be similar in aberration measurements is stricter than that in the image formation process, generally they must be treated as different in aberration measurements. The differences between transmission and reception aberration profiles caused by the system can be calibrate with a tissue mimicking phantom and the calibration results can be used to check the quality of the peak-position measurement of cross-correlation functions in the phase-aberration profile measurements. For example, the peak position $\Delta\tau_{j+1,j}$ of the cross-correlation function between reciprocal signal $y_{j+1,j}(t)$ 39 and $y_{j,j+1}(t)$ 37 is shown in equation (7); it can be measured quite accurately by averaging many transmissions and/or many speckle-generating regions in the tissue-mimicking phantom to reduce the noise effect. The profile of $\Delta\tau_{j+2,j+1} - \Delta\tau_{j+1,j}$ is $$\Delta\tau_{j+2,j+1} - \Delta\tau_{j+1,j} = (\phi_{j+2} - \theta_{j+2}) - (\phi_j - \theta_j), j=1,2,\ldots N-2. \quad (62)$$

This profile can be used for monitoring the quality of common-midpoint signals in the measurements. In the phase-aberration measurements, the profile of signal $y_{j,j}(t)$ is cross correlated with signal $y_{j-1,j+1}(t)$ and $y_{j+1,j-1}(t)$ separately, and the peak positions of cross correlation functions are measured, which gives the following values:

$$\Delta\tau_{j-1,j+1} = (\phi_j + \theta_j) - (\phi_{j-1} + \theta_{j+1}) \quad (63)$$

$$\Delta\tau_{j+1,j-1} = (\phi_j + \theta_j) - (\phi_{j+1} + \theta_{j-1}) \quad (64)$$

The profile of $\Delta\tau_{j-1,j+1} - \Delta\tau_{j+1,j-1}$, where $$\Delta\tau_{j-1,j+1} - \Delta\tau_{j+1,j-1} = (\phi_{j+1} - \theta_{j+1}) - (\phi_{j-1} - \theta_{j-1}), j=2,3,\ldots N-1 \quad (65)$$

should be similar to the calibrated profile in (62). If the difference is large, it indicates that the noise is strong, therefore the measurement should be discarded. The above algorithm is implemented in the digital processor 530 in FIG. 8.

VII. Reducing the Effects of Tissue Motions

When the tissue is moving during the aberration measurement, the accuracy of the measurement may be reduced. If the movement does not influence the aberration profile, this effect can be removed by the following method.

Figure 16:
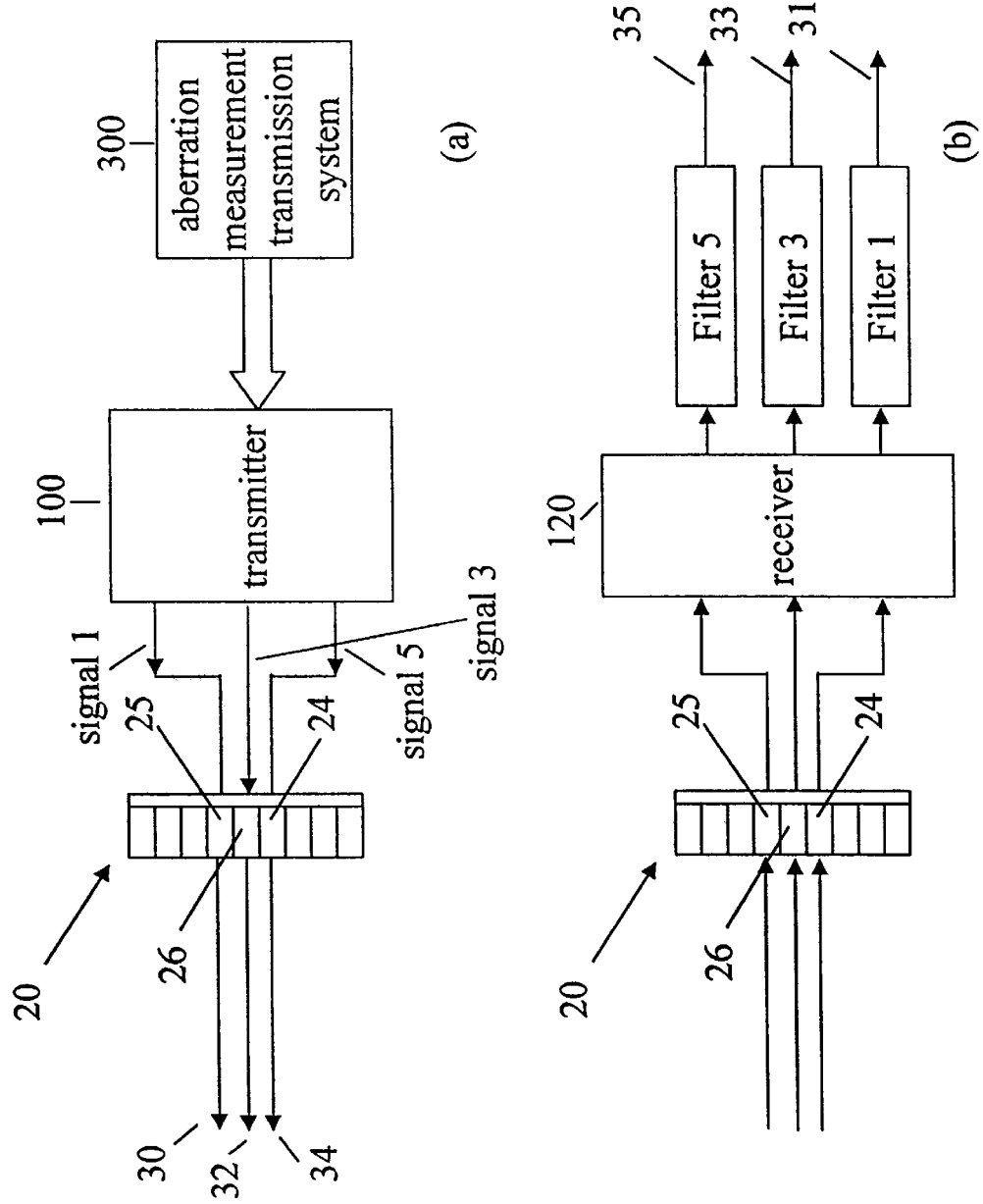
FIG. 16 is a schematic representation showing a method disclosed in the present invention for the simultaneous collection of common-midpoint signals by transmitting signals, which occupy different frequency bands, simultaneously from several elements and filtering the received signals. This will reduce the effect of tissue motions on the aberration-measurement accuracy.
Figure 17:
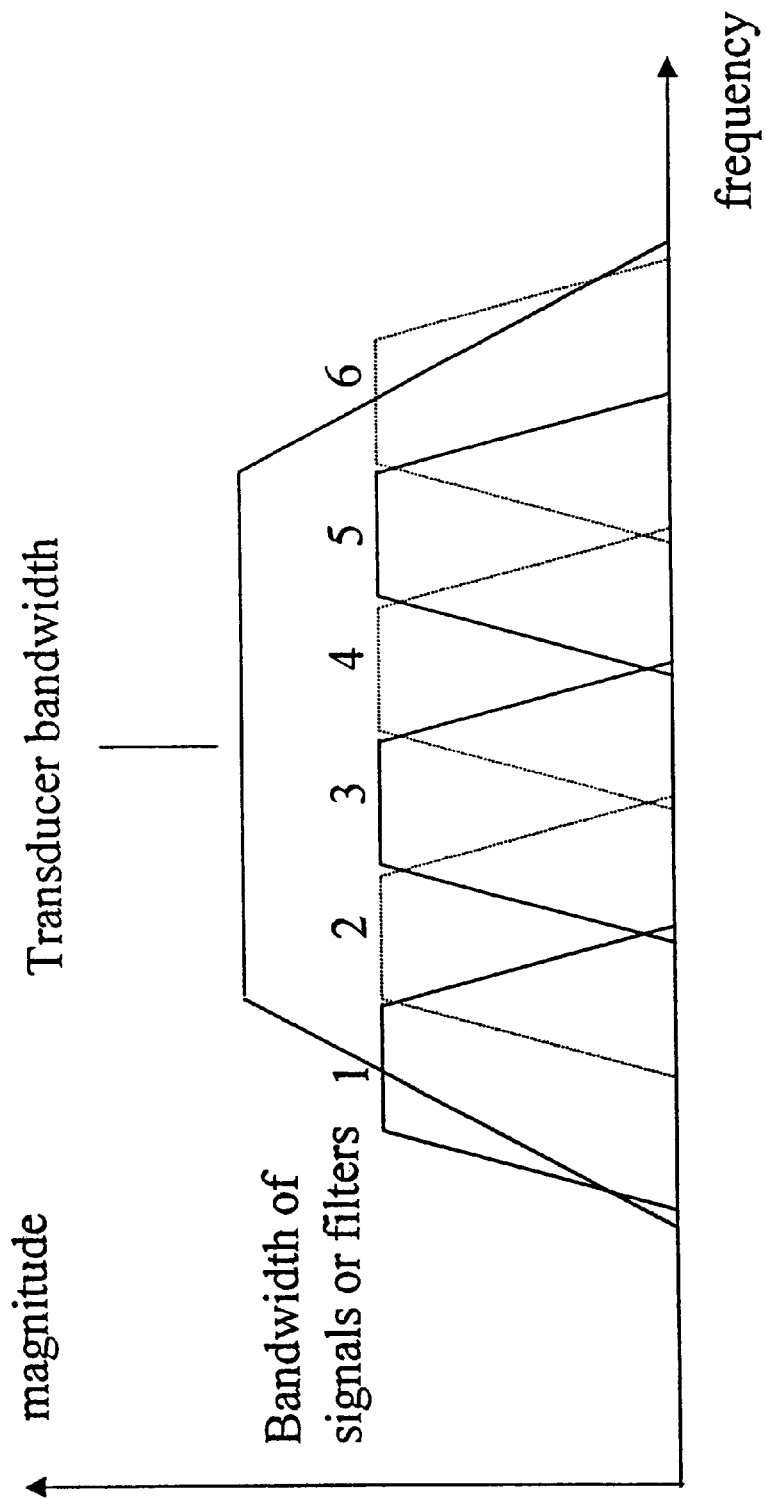
FIG. 17 is a schematic representation showing the different bands of the signals and filters used in the method disclosed in the present invention for simultaneous collections of common-midpoint signals.

As shown in FIG. 16, common-midpoint signals, 31, 33, 35, which are going to be cross-correlated with one another, can be collected simultaneously by transmitting signals 1, 3, and 5, which occupy different frequency bands as shown in FIG. 17, from transducer elements 25, 26, 24 respectively and then, separating them with filtering.

VIII. Signal Collections With Simultaneous Transmission

The above method may also be used for reducing the time needed to collect all the necessary signals for aberration measurement. The direct method for collecting common-midpoint signals is by transmitting at one element at a time and receiving at several elements, repeating this until all elements have transmitted. However, if a high frame rate is required, this method may be too slow. A simultaneous transmission method is disclosed below in this invention, with which the time requirement for data collection will be reduced. Several methods for reducing the adverse effects of the simultaneous transmission method are also disclosed.

Even though, long pulses will reduce the similarity between common-midpoint signals, aberration measurements can use signals with much narrower bandwidth compared with that for imaging. Therefore, several signals with approximately non-overlapping bandwidths within the transducer bandwidth can be transmitted simultaneously to collect common-midpoint signals, as shown in FIGS. 16 and 17. Generally, several transmissions are still needed to collect all the necessary common-midpoint signals for the measurement. The bandwidths of these signals are generally overlapped somewhat. To reduce the overlapping problem, the elements used to transmit these signals should be arranged in a way so that the two common-midpoint signals, which are going to be cross-correlated with one another, are collected with non-overlapping signals, or from different groups of simultaneous transmissions. This can be done by simultaneously transmit from elements located at a large distance from one other.

While the present invention has been described with reference to a few specific embodiments, particularly relating to ultrasound imaging systems, many modifications and changes will occur to those skilled in the art. It is, therefore, to be understood that the appended claims are intended to cover all such modifications and changes as fall within the true spirit of the invention. It should also be apparent that the method and apparatus of this invention would be equally applicable to other pulse-echo imaging modalities, such as radar and sonar imaging systems.

What is claimed is:

1. A method for correcting for phase and/or amplitude aberrations in ultrasound images comprising:

converting electrical signals supplied to a transducer array comprised of elements into ultrasound signals and converting received ultrasound echo signals into electrical echo signals;

producing a transmission beam from a transmitter, said transmitter operable in both an imaging mode, and an aberration-measurement mode;

receiving said electrical echo signals by a receiver, said receiver operable in both an imaging mode, and an aberration-measurement mode;

applying a dynamic near-field delay correction on common-midpoint signals obtained using said aberration-measurement mode by transmitting from selectable ones of said elements;

calculating a set of normalized cross-correlation functions between the common-midpoint signals to generate a set of peak position $\tau$ and cross-correlation coefficient $\rho$ values;

obtaining the energy E of each common-midpoint signal;

deriving and storing phase-aberration $\Delta\tau$ and amplitude aberration A values for each element from the measured $\tau$, $\rho$, and E values; and coupling the aberration measurement results ($\Delta\tau$, A) in said receiver and said transmitter to correct for aberrations when said imaging apparatus is switched to said imaging mode to improve the image quality.

2. The method of claim 1, wherein the image energy in a region of interest is measured, and an adjustable linear term is added to the derived aberration profile so that the image energy in the region of interest is maximized.

3. The method of claim 1, wherein said common-midpoint signals are obtained by transmitting from one element of said transducer array at a time and receiving at several selected elements of said transducer array.

4. The method of claim 1, wherein said common-midpoint signals are obtained by transmitting from several elements of said transducer array simultaneously with different bandwidth or coding, then filtering and/or decoding the received signals to obtain common-midpoint signals that are cross-correlated with one another.

5. The method of claim 1, wherein said common-midpoint signals are obtained by transmitting from several elements of said transducer array simultaneously with different bandwidth or coding, then filtering and/or decoding the received signals to obtain common-midpoint signals with the number of separate transmissions being less than the total number of elements in said transducer array to increase the speed of the common-midpoint signal collecting process.

6. The method of claim 1, wherein said common-midpoint signals are obtained by transmitting from several elements of said transducer array, located at a substantial distance from each other, simultaneously so as to obtain common-midpoint signals with the number of separate transmissions being less than the total number of elements in said transducer array to increase the speed of the common-midpoint signal collecting process.

7. The method of claim 1, wherein said common-midpoint signals are collected with three neighboring elements in said transducer array.

8. The method of claim 1, wherein said common-midpoint signals are collected with three neighboring sub-arrays, and each sub-array contains a plural number of elements in said transducer array.

9. The method of claim 1, wherein said interpolations, dynamic near-field delay corrections, calculations of cross-correlation functions, and/or any other processing and/or calculations are performed in the frequency and/or time domain.

10. The method of claim 1, wherein said common-midpoint signals are collected with three neighboring elements, and said dynamic near-field delay correction is applied to said common-midpoint signals at a selected correction angle.

11. The method of claim 1, wherein said common-midpoint signals are collected with three neighboring sub-arrays, and a dynamic sub-array beam former is used to form common-midpoint signals at a selected correction angle.

12. The method of claim 1, wherein said common-midpoint signals are collected with three neighboring elements, and said dynamic near-field delay correction is obtained at a plurality of velocities and/or directions, and the corrected signals are averaged prior to cross-correlating said common-midpoint signals.

13. The method of claim 1, wherein said common-midpoint signals are collected with three neighboring elements, and said dynamic near-field delay correction is obtained at a plurality of velocities and/or directions, and the peak positions of the cross-correlation functions with the maximum peak values are used for deriving the aberration profiles.

14. The method of claim 1, wherein said common-midpoint signals are collected with three neighboring elements, and said dynamic near-field delay correction is performed at directions towards a region of interest or at the same angle for all common-midpoint signal pairs.

15. The method of claim 1, wherein said common-midpoint signals are collected with sub-arrays, and the beams of sub-arrays are formed towards the same steering angle or the same image line, resulting in a plurality of aberration profiles being obtained, one for each steering angle or image line.

16. The method of claim 1, wherein said common-midpoint signals are collected with sub-arrays, and the beams of sub-arrays are formed with only one signal for each midpoint position.

17. The method of claim 1, wherein said common-midpoint signals are collected with sub-arrays, and apodization is utilized to reduce side lobe levels of the beams of said sub-arrays.

18. The method of claim 1, wherein a weight-and-add process is used to derive the aberration profile.

19. The method of claim 1, wherein the amplitude-aberration profile is obtained based on two common-midpoint signals.

20. The method of claim 19, wherein the amplitude-aberration profile is obtained by taking the logarithm of the ratio of energies of two common-midpoint signals.

21. The method of claim 1, wherein said common-midpoint signals are collected with three neighboring elements, and when the transmission and reception phase-aberration profiles can be considered as identical, the two reciprocal signals collected with the two outside elements of the three neighboring elements are averaged.

22. The method of claim 1, wherein said common-midpoint signals are collected with three neighboring elements, and when the transmission and reception phase-aberration profiles are different and the difference is below a threshold for image formation but is above a threshold for phase-aberration profile measurements, the two reciprocal signals collected with the two outside elements of the three neighboring elements are cross-correlated separately with the signals collected with the center element, and the average of the two peak-position values are utilized to derive the average phase-aberration profile of the transmission and reception aberration profiles.

23. The method of claim 22, wherein said common-midpoint signals are collected with three neighboring elements, and when the transmission and reception phase-aberration profiles are different and the difference is above a threshold for both image formation and phase-aberration profile measurements, by solving a set of equations generated by the peak positions of the cross-correlation functions between reciprocal signals and with the average profile of the transmission and reception phase-aberration profiles derived with the method, the transmission and reception phase-aberration profiles are measured separately, and they are used to correct for the phase aberrations for transmission and reception respectively.

24. The method of claim 23, wherein said common-midpoint signals are collected with three neighboring elements, and when the differences between transmission and reception phase and amplitude aberration profiles are caused by system errors, the solutions of the set of equations generated from reciprocal signals in said method are obtained with data collected from a standard object, such as a tissue-mimicking phantom, and utilized in the aberration profile measurement process.

25. The method of claim 23, wherein said common-midpoint signals are collected with three neighboring elements, and when the differences between transmission and reception phase and amplitude aberration profiles are caused by system errors, the solutions of the set of equations generated from reciprocal signals in said method are obtained with data collected from a standard object, and are be utilized to determine the accuracy of aberration measurements.

26. The method of claim 1, wherein said common-midpoint signals are collected with three neighboring elements, and when the transmission and reception amplitude-aberration profiles are different and the difference is below a threshold for image formation but is above a threshold for amplitude-aberration profile measurements, an average value based on the two reciprocal signals collected with the two outside elements of the three neighboring elements and the signal collected with the center element, are utilized to derive the geometric mean of the transmission and reception amplitude-aberration profiles.

27. The method of claim 26, wherein said common-midpoint signals are collected with three neighboring elements, and when the transmission and reception amplitude-aberration profiles are different and the difference is above a threshold for both image formation and amplitude-aberration profile measurements, by solving a set of equations generated based on two reciprocal signals and with the geometric mean profile of the transmission and reception amplitude-aberration profiles derived with the method, the transmission and reception amplitude-aberration profiles are measured separately, and they are used to correct for the amplitude aberrations for transmission and reception respectively.

28. The method of claim 27, wherein said common-midpoint signals are collected with three neighboring elements, and when the differences between transmission and reception phase and amplitude aberration profiles are caused by system errors, the solutions of the set of equations generated from reciprocal signals in said method are obtained with data collected from a standard object, such as a tissue-mimicking phantom and utilized in the aberration profile measurement process.

29. The method of claim 27, wherein said common-midpoint signals are collected with three neighboring elements, and when the differences between transmission and reception phase and amplitude aberration profiles are caused by system errors, the solutions of the set of equations generated from reciprocal signals in said method are obtained with data collected from a standard object, and are utilized to determine the accuracy of aberration measurements.

30. The method of claim 27, wherein the equations are generated based on the logarithm of the ratio of the energies of the two reciprocal signals and said geometric mean profile.

31. The method of claim 26, wherein the average value is the average of the logarithms of the ratio of the energies of said two reciprocal signals and said signal is collected with the center element.

32. The method of claim 1, wherein said transducer array is a two-dimensional array, and when the transmission and reception aberration profiles are identical, the method for a one-dimensional array is applied along all rows and two or more columns of the transducer array, a linear term defined by measurements from columns is added to each of the row measurements to obtain the two-dimensional aberration profiles.

33. The method of claim 1, wherein said transducer array is a two-dimensional array, and when the transmission and reception phase-aberration profiles are different and the difference is below a threshold for image formation but is above a threshold for phase-aberration profile measurement, the method for a one-dimensional array is applied along all rows and two or more columns of the transducer array, and a linear term defined by measurements from columns is added to each of the row measurements to obtain the two-dimensional aberration profiles.

34. The method of claim 1, wherein said transducer array is a two-dimensional array, and when the transmission and reception phase-aberration profiles are different and the difference is above a threshold for both image formation and phase-aberration profile measurements, the method for a one-dimensional array is applied along all rows and two or more columns of the transducer array, and a linear term with the average slope of the slopes of linear terms defined by the column measurements for each of the row transmission and reception aberration profile measurements is added to the row measurements to obtain the two-dimensional transmission and reception aberration profiles.

35. In the method of claim 1, wherein said transducer array is a two-dimensional array, and aberration profiles measured from any set of rows and/or columns of said transducer array are averaged to improve the measurement accuracy.

36. In the method of claim 1, wherein said transducer array is a two-dimensional array, and one of the four undetermined phase-aberration values at the four-corners of the transducer array is adjusted so that the image energy in the region of interest is maximized.

37. In the method of claim 1, wherein said transducer array is a two-dimensional array, and the undetermined phase-aberration plane profile is adjusted so that the image energy in the region of interest is maximized.

38. In the method of claim 1, wherein when a region of interest is identified in the image, only transducer elements involved in the image formation of that region are utilized for aberration measurements.

* * * * *